(12) United States Patent
Smith et al.

(10) Patent No.: US 12,049,330 B2
(45) Date of Patent: Jul. 30, 2024

(54) METHODS AND SYSTEMS FOR ASSEMBLY AND INSTALLATION OF AIRFRAME FLOOR GRIDS

(71) Applicant: The Boeing Company, Chicago, IL (US)

(72) Inventors: Daniel R. Smith, Woodinville, WA (US); Darrell D. Jones, Mill Creek, WA (US); Jeremy Evan Justice, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 276 days.

(21) Appl. No.: 17/454,291

(22) Filed: Nov. 10, 2021

(65) Prior Publication Data

US 2022/0153447 A1 May 19, 2022

Related U.S. Application Data

(60) Provisional application No. 63/115,049, filed on Nov. 18, 2020.

(51) Int. Cl.
*B64F 5/10* (2017.01)
*B23P 19/04* (2006.01)
*B23Q 3/06* (2006.01)
*B64C 1/06* (2006.01)

(52) U.S. Cl.
CPC .............. *B64F 5/10* (2017.01); *B23P 19/04* (2013.01); *B23Q 3/062* (2013.01); *B64C 1/069* (2013.01)

(58) Field of Classification Search
CPC ..................................................... B64F 5/10
See application file for complete search history.

(56) References Cited

U.S. PATENT DOCUMENTS

2013/0019446 A1* 1/2013 Venskus ................ B23Q 1/012
29/407.09
2016/0354883 A1 12/2016 Vogt et al.

FOREIGN PATENT DOCUMENTS

| EP | 2604523 A2 | 6/2013 | |
|---|---|---|---|
| WO | 2007057411 A1 | 5/2007 | |
| WO | WO-2007057411 A1 * | 5/2007 | ............... B64F 5/10 |

OTHER PUBLICATIONS

Extended European Search Report dated Apr. 4, 2022 regarding EP Application No. 21207355.5; 11 pages.
Netherlands Patent Office Written Opinion and Search Report with English Translation, dated Jul. 19, 2021, regarding Application No. NL2027389; 13 pages.

* cited by examiner

*Primary Examiner* — Jason L Vaughan
*Assistant Examiner* — Amanda Kreiling
(74) *Attorney, Agent, or Firm* — Yee & Associates, P.C.

(57) ABSTRACT

Systems and methods are provided for assembling an aircraft. The method includes receiving a lower half barrel section of fuselage that is inverted to a keel-up orientation; and installing a floor grid into the lower half barrel section while inverted.

32 Claims, 12 Drawing Sheets

METHODS AND SYSTEMS FOR ASSEMBLY AND INSTALLATION OF AIRFRAME FLOOR GRIDS

CROSS-REFERENCE TO RELATED APPLICATION

This application claims the benefit of U.S. Provisional Patent Application Ser. No. 63/115,049 filed Nov. 18, 2020, and entitled "Method and Systems for Assembly and Installation of Airframe Floor Grids" which is incorporated herein by reference in its entirety.

FIELD

The disclosure relates to the field of aircraft, and in particular, to fabrication of aircraft such as the installation of floor grids.

BACKGROUND

In the aerospace industry, operations relating to transport and assembly of airframe components are performed in fixed cells. In each cell, a structure is scanned and/or indexed to the cell, and then tools, equipment, and/or workers are brought to that portion of the structure needing to be worked upon in that cell. This process of scanning and/or indexing occurs every time a new structure is brought to the cell. Furthermore, when a structure is moved to a next cell, it is again scanned and/or indexed to the cell and the necessary tools, equipment, and/or workers are brought to that portion of the structure needing to be worked upon in that cell. Current assembly methods require tools, tooling and technicians to enter the barrel sections, which is a portion of a fuselage, through barrel ends or doorways. The tooling and tools have to be set up in place within the barrel section. When work is completed, the tooling, tools and technicians have to be transported out through barrel ends or doorways.

Therefore, it would be desirable to have a method and apparatus that take into account at least some of the issues discussed above, as well as other possible issues.

SUMMARY

Embodiments described herein provide for continuous line assembly layouts and systems that enable work to be performed on moving airframe components which are pulsed or moved continuously in a process direction to cross the paths of stations which perform work on the airframe components. The work may include laying up a preform for hardening into a composite part, hardening the composite part in an autoclave, installing frames, cutting out holes for windows or doors, etc. Particular embodiments are directed to the fabrication and installation of floor grids into an inverted lower half barrel section of fuselage. These arrangements provide a technical benefit over prior systems because they reduce amounts of space required for fabrication and assembly at a factory floor, increase throughput, and reduce downtime.

In one aspect, a method for assembling an aircraft is described. The method includes receiving a lower half barrel section of fuselage that is inverted to a keel-up orientation, and installing a floor grid into the lower half barrel section while inverted.

In another aspect, a system is described. That system includes a plurality of work stations that install floor grid components onto a floor grid, a track that advances the floor grid in a process direction through the work stations, and at least one feeder line associated with one of the work stations, the feeder line operable to provide a floor grid component to the work station just-in-time for installation onto the floor grid.

In still another aspect, a method for fabricating a portion of an aircraft is described. That method includes feeding floor beams, intercostals, and tracks to work stations via a feeder line associated with each work station, and assembling the floor beams, intercostals, and tracks together into a floor grid.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DETAILED DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

The airframe components discussed herein may be fabricated from metal or may be fabricated as composite parts. Composite parts, such as Carbon Fiber Reinforced Polymer (CFRP) parts, are initially laid-up in multiple layers that together are referred to as preforms. Individual fibers within each layer of a preform are aligned parallel with each other, but different layers exhibit different fiber orientations in order to increase the strength of the resulting composite part along different dimensions. The preform includes a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber is infused with resin prior to curing. For thermoset resins, the hardening is a one-way process referred to as curing, while for thermoplastic resins, the resin reaches a viscous form if it is re-heated.

Figure 1:
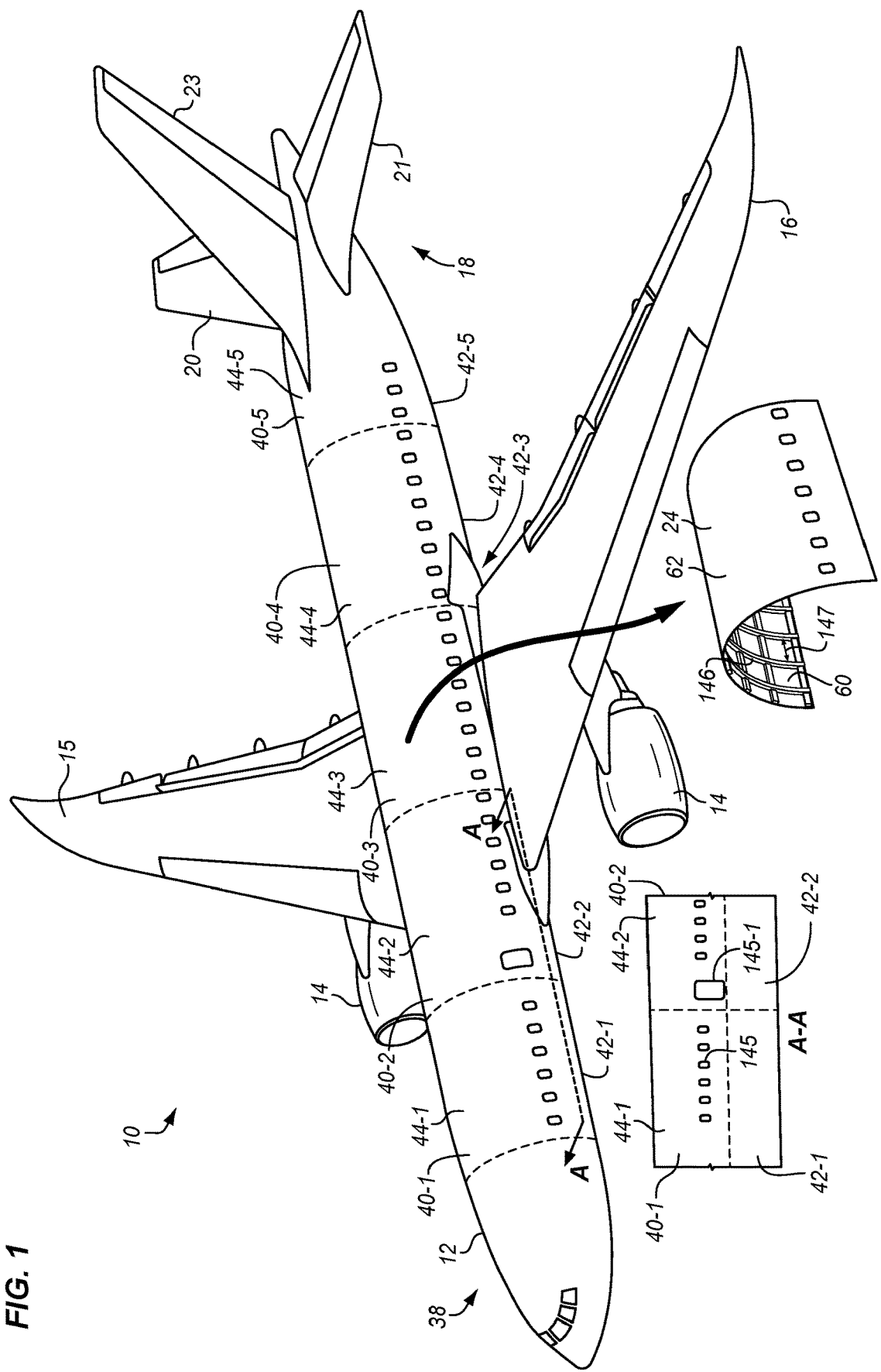
FIG. 1 illustrates an aircraft fabricated from half barrel sections.

Turning now to FIG. 1, an illustration of an aircraft 10 is depicted in which an illustrative embodiment may be implemented. In this illustrative example, aircraft 10 has a right wing 15 and left wing 16 attached to fuselage 12. One each of engines 14 are attached to right wing 15 and left wing 16. Embodiments of aircraft 10 are known with additional engines 14 and different engine placements. Fuselage 12 includes a tail section 18 and a nose section 38. Horizontal stabilizer 20, horizontal stabilizer 21, and vertical stabilizer 23 are attached to tail section 18 of fuselage 12. Aircraft 10 is an example of an aircraft where the majority of the fuselage 12 is formed from multiple half barrel sections 24, the fabrication is which is partially illustrated in FIG. 2. The multiple half barrel sections 24, when attached together, form the majority of fuselage 12.

As mentioned, fuselage 12 is fabricated from multiple half barrel sections 24. Half barrel sections 24 are configured to be either an upper half barrel section 40 or a lower half barrel section 42 which are ultimately joined together to form a full barrel section 44. FIG. 1 depicts several full barrel sections 44 including: 44-1, 44-2, 44-3, 44-4, and 44-5. For completeness, full barrel section 44-1 is fabricated using upper half barrel section 40-1 and lower half barrel section 42-1, full barrel section 44-2 is fabricated using upper half barrel section 40-2 and lower half barrel section 42-2, full barrel section 44-3 is fabricated using upper half barrel section 40-3 and lower half barrel section 42-3, full barrel section 44-4 is fabricated using upper half barrel section 40-4 and lower half barrel section 42-4, and full barrel section 44-5 is fabricated using upper half barrel section 40-5 and lower half barrel section 42-5. The full barrel sections 44-1, 44-2 correspond to view A-A and illustrate that the full barrel sections 44 are serially fastened into fuselage 12. Lower half barrel section 42-3 is sometimes referred to as a wing box as the wings 15 and 16 attach to this section.

All of the above described half barrel sections (e.g., upper half barrel section 40 and lower half barrel section 42), unless specifically otherwise described, will be referred to generically as half barrel section 24. As shown in FIG. 1, each half barrel section 24 includes one or more frames 146, separated at a frame pitch 147, which helps define an inner mold line loft 60 and an outer mold line loft 62 for the half barrel section 24. In some embodiments, the half barrel section 24 comprises a hardened composite skin part or a metal skin part, such as those awaiting installation of window surrounds 145 and door surrounds 145-1 (view A-A) and frames 146 to enhance rigidity.

Figure 2:
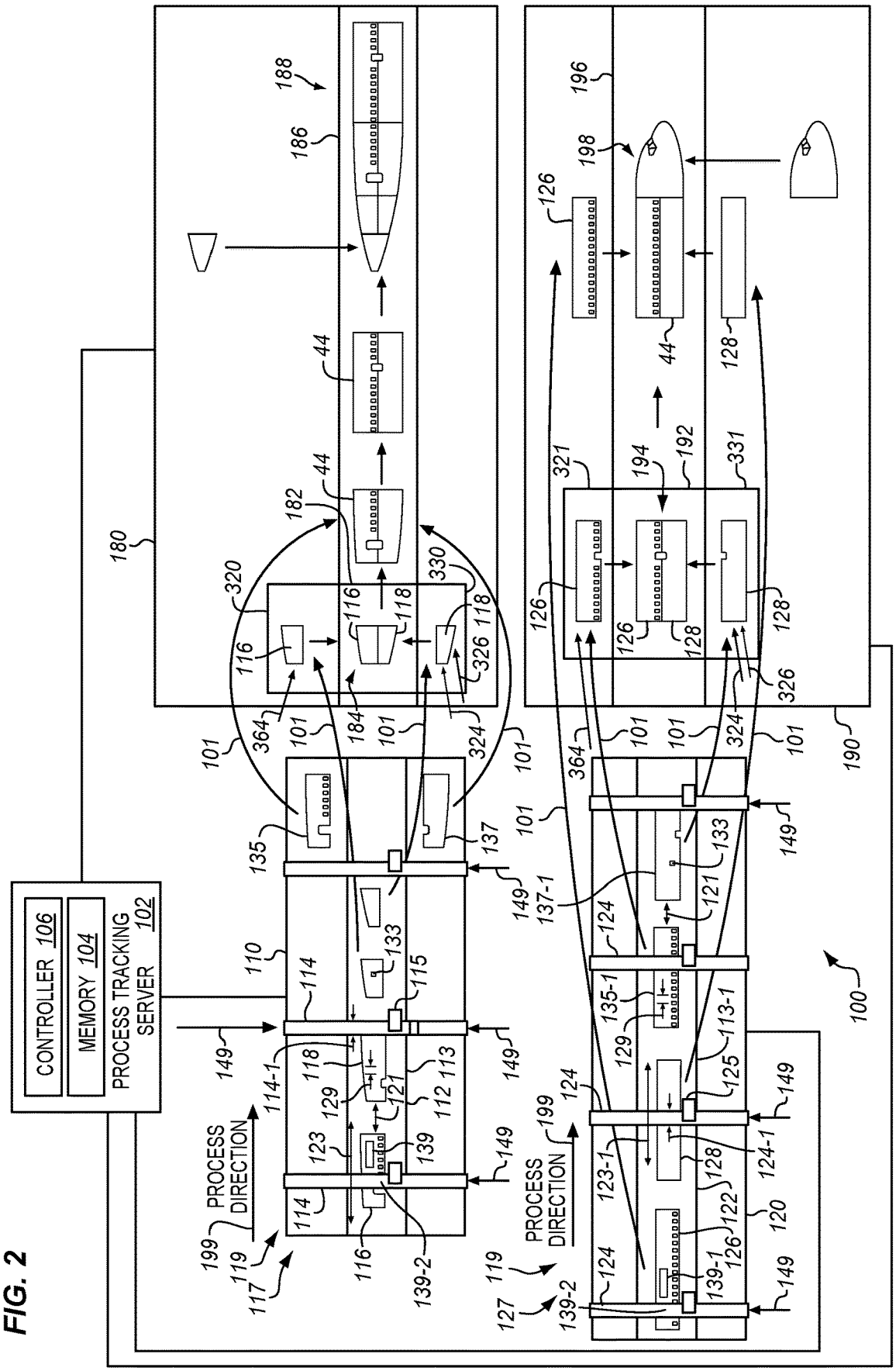
FIG. 2 depicts an assembly environment for a factory in an illustrative embodiment.

FIG. 2 depicts an assembly environment 100 in an illustrative embodiment. Assembly environment 100 comprises an arrangement of machinery and tools that facilitates efficient and repeatable fabrication of aircraft, such as aircraft 10 in FIG. 1. Assembly environment 100 has been enhanced to enable large airframe components, such as those for wing panels or sections of fuselage, to be fabricated and assembled on continuous, micro pulsed and/or pulsed assembly lines. This enables the portion of the structure needing work to be brought to workers, tools, and equipment, instead of requiring workers, tools, and equipment be brought to or into the structure. Assembly environment 100 provides a substantial benefit by reducing the amount of non-value added time expended during the assembly of an airframe, while also reducing the amount of factory space occupied by increasing work density. An embodiment has one half barrel section 24 in FIG. 1 as a composite skin part of one aircraft model and another half barrel section 24 as a metal skin part progressing serially down the assembly environment 100.

A process tracking server 102 tracks and/or manages the operations of assembly environment 100 via memory 104 and controller 106, which in the illustrated embodiment includes assembly lines 110, 120. Assembly line 110 operates to perform assembly operations on an upper half barrel section 116 and a lower half barrel section 118. Assembly line 120 operates to perform assembly operations on an upper half barrel section 126 and a lower half barrel section 128. One difference between assembly lines 110 and 120 is that assembly line 110 is configured for the assembly of non-cylindrical half barrel sections while assembly line 120 is configured for the assembly of cylindrical half barrel sections. Generally, operations of assembly lines 110 and 120 are the same, and reference numbers referring to components found in both assembly lines 110, 120 will be used, for example, work stations 114, 124 where work stations 114 are within assembly line 110 and work stations 124 are within assembly line 120. A similar methodology is used when referring to the components that are assembled in the assembly lines 110, 120. For example, upper half barrel section 116 is assembled in assembly line 110, while upper half barrel section 126 is assembled within assembly line 120. Similarly, lower half barrel section 118 is assembled in assembly line 110, while lower half barrel section 128 is assembled within assembly line 120. When a difference between the two assembly lines 110, 120 is relevant, an explanation will be provided herein.

As further discussed herein the process tracking server 102 directs the operations of one or more work stations 114, 124 in the assembly environment 100. In this embodiment, the process tracking server 102 includes a memory 104 that stores one or more Numerical Control (NC) programs for operating the assembly lines 110, 120. Controller 106 of the process tracking server 102 may further process feedback from the work stations 114, 124 and/or assembly lines 110, 120, and provide instructions to the work stations 114, 124 or reports to an operator based on such feedback.

In one embodiment, Radio Frequency Identifier (RFID) readers or other indexing components 115, 125 associated with a corresponding work station 114, 124, enable the act of indexing to directly provide instructions to a work station 114, 124. The instructions are for the portion of the upper half barrel section 116, 126 and lower half barrel section 118, 128 within the purview 114-1, 124-1 of the work stations 114, 124. In such an embodiment, the instructions can be passed between controller 106 and the particular work station 114, 124. Controller 106 may be implemented, for example, as custom circuitry, as a hardware processor executing programmed instructions, or some combination thereof. Memory 104 stores instructions for operating controller 106, and stores digital data.

In this embodiment, assembly environment 100 includes an assembly line 110 for fabricating sections of fuselage 12 in FIG. 1 that exhibit non-uniform cross sections across their length, and further includes an assembly line 120 for fabricating sections of fuselage 12 that exhibit largely uniform cross sections across their length. The assembly line 110 processes upper half barrel section 116 and a complementary lower half barrel section 118, respectively. The assembly line 120 processes upper half barrel section 126 and a complementary lower half barrel section 128, respectively. When upper or lower is not relevant, upper half barrel section 116 and lower half barrel section 118 are sometimes referred to together herein as a half barrel section 117, while upper half barrel section 126 and lower half barrel section 128 are sometimes referred to together herein as half barrel section 127. Arcuate sections 119 refer to any type of barrel section including half barrel sections 117, 127, quarter barrel sections, and one third barrel sections, with or without a uniform cross-section.

Half barrel sections 117, 127 correspond to half barrel sections 24 after processing through assembly environment 100. The assembly lines 110, 120 discussed herein may further be operated to fabricate multiple sets of half barrel sections 117, 127 or other arcuate sections 119.

The assembly line 110 is configured with work stations 114 that are capable of accommodating upper half barrel sections 116 and lower half barrel sections 118 with more exotic shapes such as tapered, as well as other arcuate sections 119 near the nose section 38 or tail section 18. Work stations 114 associated with assembly line 110 exhibit a broader range of motion in order to accommodate the tapered nature of these half barrel sections 117 and non-uniform cross section arcuate sections 119.

The assembly line 110 further includes a track 112, along which upper half barrel sections 116 and lower half barrel sections 118 proceed in a process direction 199. Track 112 includes a drive system 113 to advance half barrel sections 117 along the track 112. The track 112 brings the half barrel sections 117 in a process direction 199 to tools and equipment (not shown) disposed at work stations 114, 124 which are serially arranged in a process direction 199.

The track 112 may comprise a series of discrete stanchions having rollers, a rail or set of rails (not shown), etc., and airframe components at the track 112 may be pulsed incrementally in the process direction 199 across the work stations 114, 124. Work stations 114, 124 are serially aligned, and the sections half barrel sections 117 or arcuate sections 119 proceed through the work stations 114, 124 serially. While only a few work stations 114, 124 are shown, many are contemplated, since work stations 114, 124 can be configured to perform operations such as, but not limited to, demolding, installing window surrounds, installing door surrounds, trimming manufacturing excess, installing frames, cutting out window manufacturing excess or otherwise removing material, Non-Destructive Inspection (NDI) inspection, edge sealing, cutting out door manufacturing excess, installing windows and installing doors. Some work stations 114, 124 may perform multiple of the above listed tasks, while other work stations 114, 124 are dedicated to a single task.

In one embodiment, the work stations 114, 124 are spaced and operated such that work is performed by multiple work stations on an upper half barrel section 116 of fuselage 12 simultaneously. The same is true for lower half barrel sections 118. In a further embodiment, the work stations 114 are arranged at a work density, at least in part, based on a takt time for the half barrel section 117 or the arcuate section 119 being fabricated. The same is true for work stations 124 with respect to upper half barrel sections 126 and lower half barrel sections 128. That is, the work stations 124 are arranged at a work density, at least in part, based on a takt time for the half barrel section 127 or the arcuate section 119 being fabricated.

The assembly line 110 processes the upper half barrel section 116 and delivers it to assembly stage 320, for example, configured as a crown module attach station, for attachment of a crown module 364. The assembly line 110 processes the lower half barrel section 118 for delivery to assembly stage 330, for example, configured as a floor grid attach station, for joining to a passenger floor grid 326 and/or a cargo floor grid 324.

Figure 5:
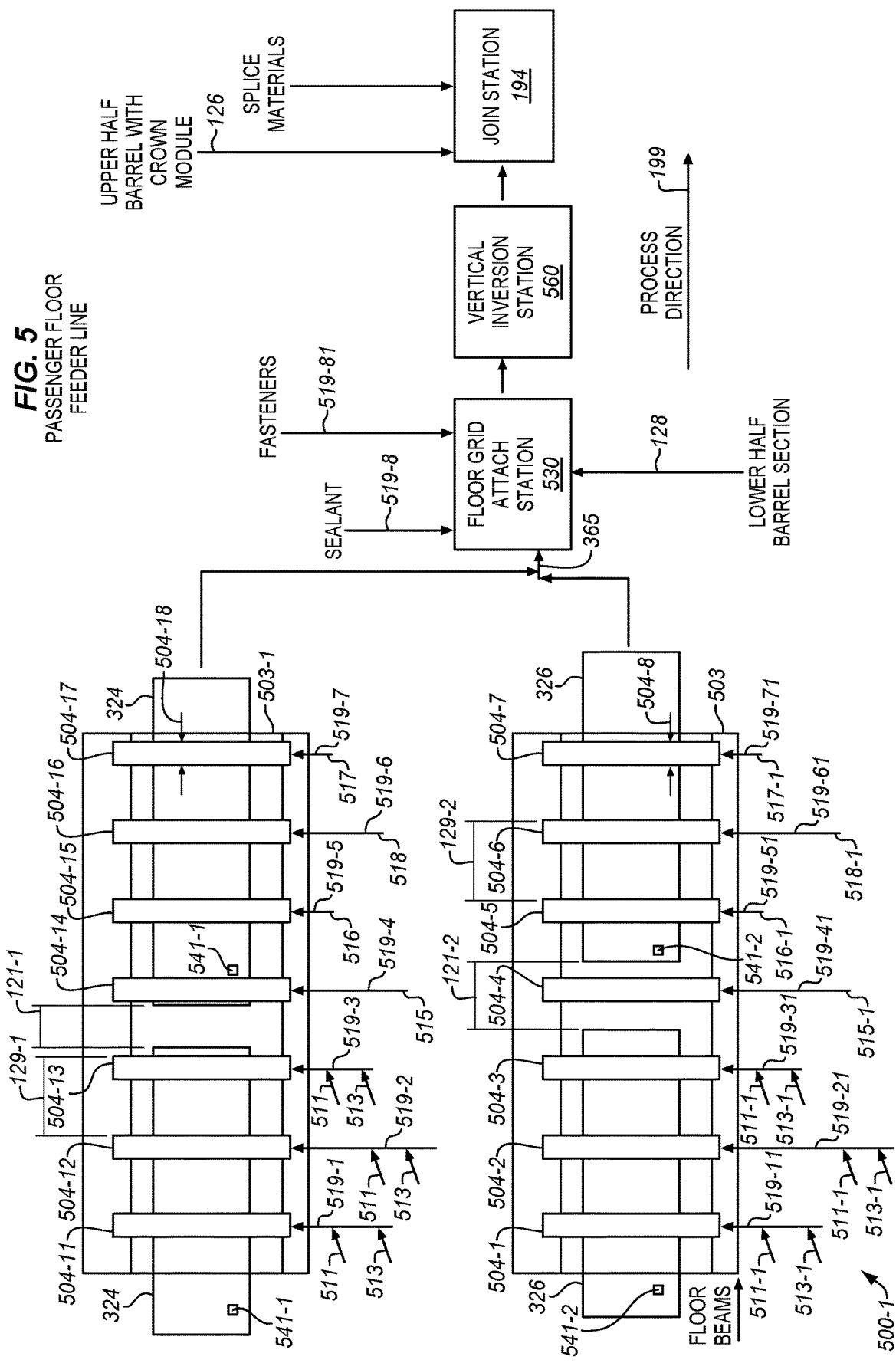
FIG. 5 is a block diagram of a floor grid assembly line for installing floor grids into lower sections of fuselage in an illustrative embodiment.

In much the same way, work stations 124 are spaced and operated in the assembly line 120 to process the upper half barrel sections 126 and the lower half barrel sections 128, that is, half barrel sections 127 along a track 122 having a drive system 113-1. The assembly line 120 processes the upper half barrel section 126 and delivers it to assembly stage 321 for joining to a crown module 364 as well as the lower half barrel section 128 which is delivered to an assembly stage 331 for joining to a passenger floor grid 326 and/or a cargo floor grid 324. It is understood that a crown module for upper half barrel section 116 is different than a crown module for upper half barrel section 126, since upper half barrel section 126 is represented as being cylindrical and longer than upper half barrel section 116, but for ease of understanding, both crown modules will be referred to herein as crown module 364. Similarly, no matter which lower half barrel section is being referred to, the passenger floor grid is referred to as passenger floor grid 326 and the cargo floor grid is referred to as cargo floor grid 324, the floor grids in combination being referred to herein in subsequent figures as floor grid 365 (FIG. 5).

The assembly line 120 includes track 122, along which upper half barrel section 126 and lower half barrel section 128 proceed in the process direction 199 in a similar fashion to that described above for the assembly line 110. The assembly line 120 further includes work stations 124 having indexing components 125. The work stations 124, indexing components 125, and track 122 may be implemented in a similar fashion to similarly recited components of the assembly line 110. However, the work stations 124 may differ in that they may be more tightly conformed to each of the upper half barrel section 126 and lower half barrel section 128 being worked upon. There is less cross sectional variation between the upper half barrel section 126 and the lower half barrel section 128 than upper half barrel section 116 and the lower half barrel section 118. As mentioned above, upper half barrel section 126 and the lower half barrel section 128 of assembly line 120 are more uniform in shape and size than of the upper half barrel section 116 and the lower half barrel section 118 of the assembly line 110.

In further embodiments, additional assembly lines fabricate wings 15, 16 for assembly together with the fuselage 12 to form a complete airframe. The assembly lines 110, 120 are either operated in a pulsed fashion where the upper half barrel sections 116, 126 and lower half barrel sections 118, 128 advance in a process direction 199 a distance equal to a length of a pulse 123, 123-1 or a micro pulse 129. Both pulse 123 and 123-1 are used to illustrate that a pulse length could be different for assembly lines 110 and 120. A micro pulse 129 is less than pulse 123, 123-1, and in an embodiment, is equal to a frame pitch 147 between frames 146 of the upper half barrel sections 116, 126 and lower half barrel sections 118, 128 or a fraction or multiple thereof. A length of a pulse 123, or a length of a micro pulse 129 can be the same for assembly lines 110 and 120, or they can be different. Frame pitch 147 in an embodiment is about 18 to about 36 inches. After the micro pulse 129, the upper half barrel sections 116, 126 and lower half barrel sections 118, 128 pause, then micro pulse again 129 in a process direction 199.

Another embodiment has the upper half barrel sections 116, 126 and lower half barrel sections 118, 128 continuously advancing in the process direction 199 without pause. Thus, the assembly lines 110, 120 discussed herein enable half barrel sections 117, 127 to proceed with a desired takt across multiple different work stations 114, 124 in a pulsed 123, 123-1, micro pulsed 129, or continuous fashion.

During these processes, tooling such as layup mandrels may be placed onto or removed from the tracks 112, 122 as needed. In one embodiment, the track 112, 122 include a drive system 113, 113-1, such as a chain drive, that moves the half barrel sections 117, 127, although in further embodiments the sections are independently driven along the tracks 112, 122.

In one embodiment, and referring to assembly line 110, the upper half barrel sections 116 and the lower half barrel sections 118 are pulsed synchronously at the same time by the same amount of distance in the process direction 199. The work stations 114 then perform work upon the upper half barrel section 116 or the lower half barrel section 118 in pauses between the pulses and/or during pauses at a common takt time. Thus, during the fabrication process, multiple work stations 114 work upon the upper half barrel sections 116 and/or the lower half barrel sections 118 during the same pause between micro pulses 129 and/or during micro pulse 129.

Similarly, and referring to assembly line 120, the upper half barrel sections 126 and the lower half barrel sections 128 are pulsed synchronously at the same time by the same amount of distance in the process direction 199. The work stations 124 then perform work upon the upper half barrel section 126 or the lower half barrel section 128 in pauses between the pulses and/or during pauses at a common takt time. Thus, during the fabrication process, multiple work stations 124 work upon the upper sections 126 and/or the lower sections 128 during the same pause between micro pulses 129 and/or during micro pulse 129.

In one embodiment of assembly line 110, one or more work stations 114 also perform their work independently or synchronously upon the same half barrel section 117 or the arcuate section 119 during a pulse. Similarly, and in regard to assembly line 120, one or more work stations 124 also perform their work independently or synchronously upon the same half barrel section 127 or the arcuate section 119 during a pulse. Such work stations might be referred to as traveling work stations 139, 139-1 as they are attached to the half barrel section and move with the half barrel section. This work may include Non-Destructive Inspection (NDI), trimming of a manufacturing excess, or application of a sealant or other processes. In further embodiments, the half barrel sections 117, 127 proceed continuously along the track 112, 122, and the work stations 114, 124 perform work on the half barrel sections 117, 127 as the half barrel sections 117, 127 and the traveling work stations 139, 139-1 attached thereto continue to move.

In some embodiments of assembly line 110 or 120, the half barrel sections 117, 127 are spaced with predetermined gaps 121 such as equal to a micro pulse 129 distance such as a fraction or multiple of frame pitch 147 or any distance less than or equal to a length of the half barrel section 117, 127 or the arcuate section 119. Such gaps 121 help to account for production delays, such as re-work or out of position work of the half barrel section 117, 127 or the arcuate section 119 or work station 114, 124 maintenance and/or technician break time.

Re-work or out of position work is rarely required, but can be performed in certain circumstances when a portion of the half barrel section 117, 127 or the arcuate section 119 needing re-work or out of position work is between work stations 114, 124 or within work stations that do not need to perform work such as a window surround installation station opposite a lower half barrel section 118. This enables unaccounted-for delays to be absorbed into the production process. The rework or out of position work discussed above can be performed within gaps 131 between the work stations 114, 124. Furthermore, in one embodiment, the half barrel section 117, 127 or the arcuate section 119 continues to progress through the work stations 114, 124 while the rework or out-of-position work is being performed. Thus, the assembly environment 100 does not stop advancing in process direction 199 to work upon half barrel section 117, 127 or the arcuate section 119 to accommodate rework or out-of-position work. Such out of position work can include scheduled and unscheduled maintenance.

During the movement or in between micro pulses 129 or pulses 123, 123-1, the half barrel sections 117, 127 or the arcuate sections 119 encounter the indexing components 115, 125 at the work stations 114, 124. The indexing components 115, 125 physically interact with or nondestructively inspect indexing features 133 on or in the upper half barrel sections 116, 126 and lower half barrel sections 118, 128 and enable alignment to the work stations 114, 124 before work is performed.

The indexing features 133, such as physical features or Radio Frequency Identifier (RFID) chips, are engaged by an indexing components 115, 125 associated with the work station 114, 124. Each indexing component 115, 125 conveys to the work station 114, 124 a 3D characterization of the upper half barrel sections 116, 126 and lower half barrel sections 118, 128 within a purview 114-1, 124-1 of the work station 114, 124. The indexing also enables the determination of which tasks that a work station 114, 124 is to accomplish on the particular half barrel section 117. The work/task is based on the information that the indexing features 133 convey to the indexing components 115, 125.

Referring back to FIG. 1, an example of 3D characterization is of the Inner Mold Line (IML) loft 60 and/or Outer Mold Line (OML) loft 62. The indexing described above results in instructions to the work station 114, 124 about the work to be performed by the work station 114, 124 upon the upper half barrel sections 116, 126 and lower half barrel sections 118, 128. This indexing process can be performed multiple times, and at the same time, per pulse, or micro pulse 129, for respective multiple work stations 114, 124. The work stations 114, 124 may then perform the work during the pause between micro pulses 129 or during the micro pulses 129 themselves.

The indexing components 115, 125 can comprise hard stops, pins, holes, or grooves that are complementary to the indexing features 133 for physical securement thereto. An embodiment has many indexing features arrayed upon the upper half barrel sections 116, 126 and lower half barrel sections 118, 128, for example, in a manufacturing excess. In further embodiments, the indexing components 115, 125 can comprise sensors, such as laser, ultrasonic, or visual inspection systems that track and then align with indexing features 133.

Additional indexing features 133 also include Radio Frequency Identifier (RFID) chips. Radio Frequency Identifier (RFID) readers are another embodiment of indexing component 115, 125, that read the Radio Frequency Identifier (RFID) chips. These non-contact techniques may be utilized, for example, within assembly lines 110, 120 that continuously move upper half barrel sections 116, 126 and lower half barrel sections 118, 128 and may further be used to control movement of the half barrel sections 117 and/or arcuate sections 119.

In further embodiments, indexing components 115, 125 of hard stops, pins, holes, or grooves that are complementary to the indexing features 133 are utilized for continuous movement systems where traveling work stations 139, 139-1 are utilized. In such embodiments, engagement of indexing features 133 to indexing components 115, 125 occur during the advancement of the upper half barrel sections 116, 126 and lower half barrel sections 118, 128 within purview 114-1, 124-1 of the next work station 114, 124. The work station 114, 124 can track the upper half barrel sections 116, 126 and lower half barrel sections 118, 128 as they advance in the process direction 199. Continuing, traveling work stations 139, 139-1 are attached in a work station 114, 124 to the upper half barrel sections 116, 126 or lower half barrel sections 118, 128 and ride along with the half barrel sections 117, 127 as it progresses in micro pulse 129, pulse 123, or continuously.

The traveling work station 139, 139-1 performs its work upon the half barrel sections 117, 127 and then separates and returns to the attachment point 139-2 for future use. An example of the traveling work station 139, 139-1 is a flex track device or some similar device that follows a track removably installed onto the upper half barrel section 116, 126 and/or lower half barrel section 118, 128.

Prior to entry into the assembly environment 100, the upper half barrel sections 116, 126 and lower half barrel sections 118, 128 are laid up upon a layup mandrel (not shown) orientated with the crown 135, 135-1 up and the keel 137, 137-1 up, respectively. The orientation of the lower half barrel sections 118, 128 is maintained from demold from the layup mandrel, through floor grid 365 (FIG. 5) installation, and up to where the lower half barrel sections 118, 128 are inverted into a keel 137, 137-1 down orientation. This inversion occurs in an inversion station 560 (FIG. 6) just prior to pulsing to join station 194. This configuration enables different work stations 114, 124 to serially process the upper half barrel sections 116, 126 and lower half barrel sections 118, 128 in a pulsed manner through the same work stations 114, 124 during fabrication.

In one embodiment, the orientation of upper half barrel sections 116, 126 and lower half barrel sections 118, 128 on assembly line 110, 120, respectively, is set by a layup mandrel upon which the sections were laid up. The layup mandrel progresses from layup through cure with a preform laid-up onto it. After hardening, the upper half barrel sections 116, 126 and lower half barrel sections 118, 128 are then removed from the respective layup mandrels without changing the upper half barrel sections 116, 126 and lower half barrel sections 118, 128 orientation.

In an embodiment, multiple aircraft models are processed in serial on assembly lines 110, 120. Upper half barrel sections 116, 126 and lower half barrel sections 118, 128 for one model serially proceed down the assembly line 110, 120 followed by the upper half barrel sections 116, 126 and lower half barrel sections 118, 128 of a different model. For example, a lower half barrel section 118, 128 progresses down an assembly line 110, 120 followed by a complementary upper half barrel sections 116, 126. Likewise, these lower half barrel sections 118, 128 and upper half barrel sections 116, 126 might be followed by another aircraft model's lower half barrel sections 118, 128 and upper half barrel sections 116, 126, followed by the lower half barrel sections 118, 128 and upper half barrel sections 116, 126 of yet another model and so forth between aircraft models, if such a production methodology meets a need. Additionally, more than one assembly line 110, 120 each are also envisioned in some embodiments to make sure that upper half barrel sections 116, 126 and lower half barrel sections 118, 128 are produced at a desired rate.

In some embodiments, work stations 114, 124 discussed herein have the capability of performing work on different portions of upper half barrel sections 116, 126 and lower half barrel sections 118, 128 and are able to accommodate different diameters from model to model. Each indexing operation between indexing components 115, 125 and indexing features 133 tells the work station 114, 124 what lower half barrel sections 118, 128 and upper half barrel sections 116, 126 and which airplane model is within its purview 114-1, 124-1 and what work needs to be performed, or if no work needs to be performed. For example, window manufacturing excess cut out stations may refrain from creating window cut outs when a lower half barrel section 118, 128 is within their purview 114-1, 124-1 since a window cut out is not needed.

A process tracking server 102 tracks and/or manages the operations of assembly lines 110, 120 discussed herein, for example, by directing the operations of one or more stations 114, 124 in the assembly environment 100. In this embodiment, the process tracking server 102 includes a memory 104 that stores one or more Numerical Control (NC) programs for operating the assembly lines 110, 120. A controller 106 of the process tracking server 102 may further process feedback from the work stations 114, 124 and/or assembly lines 110, 120, and provide instructions to the work stations 114, 124 or reports to an operator based on such feedback. In one embodiment, Radio Frequency Identifier (RFID) readers or other indexing components 125 enable the act of indexing to directly provide instructions to a work station 114, 124 for the portion of the upper half barrel section 116, 126 and lower half barrel section 118, 128 within the purview 114-1, 124-1 of the work station 114, 124. In such an embodiment, the instructions can be passed between controller 106 and the particular work station 114, 124. Controller 106 may be implemented, for example, as custom circuitry, as a hardware processor executing programmed instructions, or some combination thereof. Memory 104 stores instructions for operating controller 106, and may comprise a suitable receptacle for storing digital data.

Figure 3:
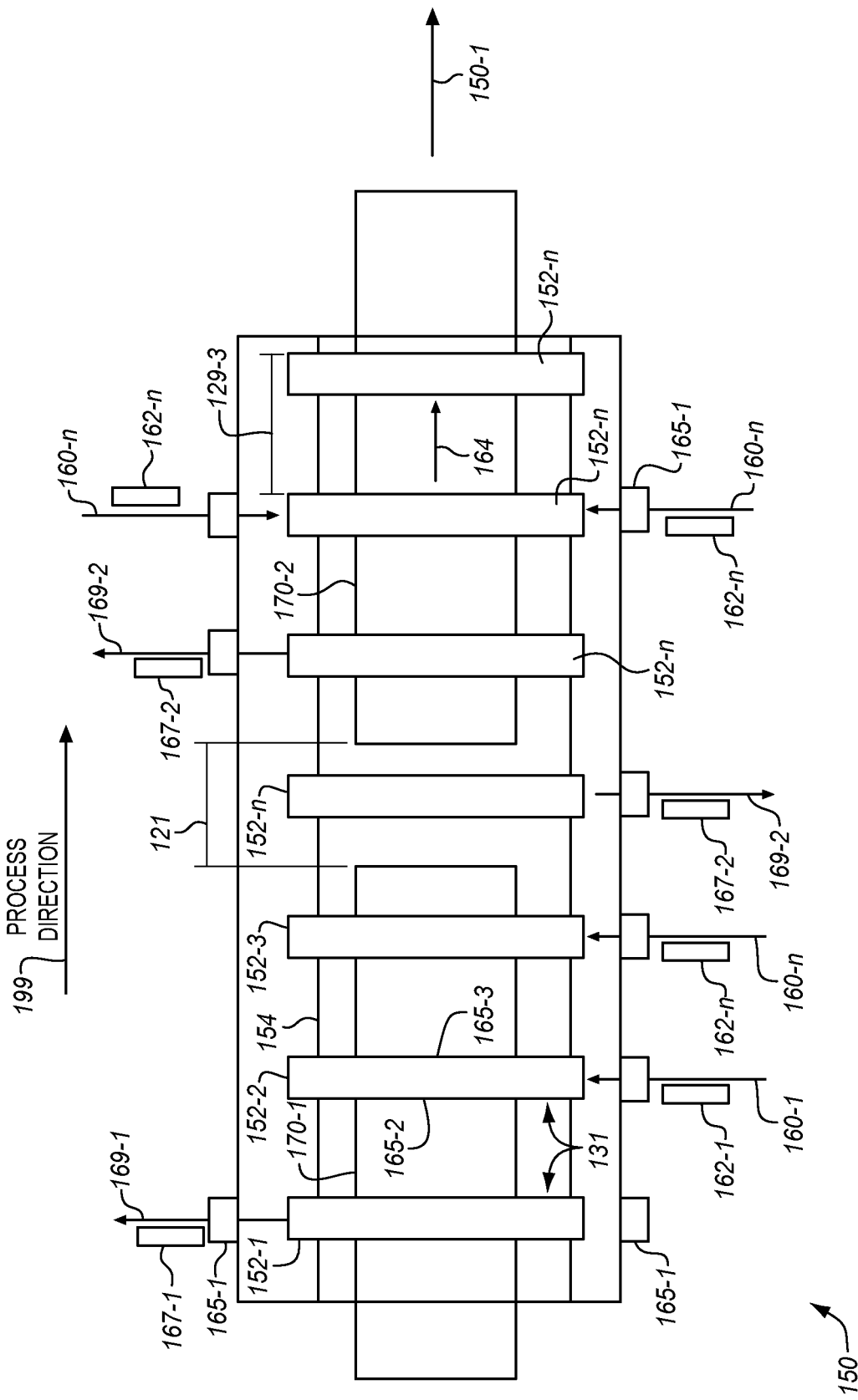
FIG. 3 depicts an assembly line for a factory in an illustrative embodiment.

According to FIG. 2, each station 114 at an assembly line 110 may be fed/supplied materials and/or components by a corresponding feeder line 149 (e.g., based on a takt time for a section of fuselage, and as illustrated in FIG. 3), and these materials and/or components are affixed to the upper half barrel section 116, 126 and lower half barrel section 118, 128 being worked upon by the work stations 114, 124. Feeder lines 149 provide additive materials/components to the work stations 114, 124. Each feeder line 149 is designed to generate materials at a takt time in order to provide the additive material/component to a work station 114, 124 just-in-time (JIT) for assembly onto a larger structure (e.g., a section of fuselage), which is also pulsed at a takt time. That is, the feeder lines 149 deliver the components just-in-time (JIT) to the work stations 114, 124 in an order of usage by the work stations 114, 124. In one embodiment, the feeder lines 149 that have a takt time equal to a fraction of a fuselage takt time.

The takt times of the feeder lines 149, and/or the assembly lines 110, 120 need not be the same. For instance, an upper half barrel section 116 and a lower half barrel section 118 may be micro-pulsed through several work stations 114 at the same time. The upper half barrel section 116 and lower half barrel section 118 are indexed to the work stations 114 and each dedicated feeder line 149 performs, for example, Non-Destructive Inspection (NDI), window surround installation, door surround installation, window manufacturing excess trim/removal, door manufacturing excess trim/removal, installing windows and installing doors etc. Feeder lines 149 also include output from the work stations 114, including Non-Destructive Inspection (NDI) inspection data and any excess trimmed off of upper half barrel section 116 and lower half barrel section 118. A similar scenario can occur for assembly line 120 and the various components therein and assembled therein.

In a further example, the feeder line 149 provides frames 146 just-in-time (JIT) to a work station 114 that installs frames 146 onto upper half barrel section 116 and lower half barrel section 118. Likewise, feeder lines 149 provide window surrounds just-in-time (JIT) to a work station 114 where window surrounds are installed and door surrounds just-in-time (JIT) to a work station 114 where door surrounds are installed. For each feeder line 149, production times are designed based on the takt of an associated work station 114. The feeder lines 149 each serially pulse components during fabrication, and completed components arrive at each work station 114 at a common takt time. This takt time design proceeds through each of the feeder lines 149 from the smallest part to the largest final assembly.

If a takt time cannot be achieved, it is possible to adjust the work statement of particular work station 114 to reduce or increase the amount of work occurring at the particular work station 114. In a further embodiment, it is possible to add or remove a work station 114 from the process based upon a work statement and a desired takt time for the entirety of assembly line 110. Takt time is considered to be a number of minutes per month, divided by a number of desired units (e.g., of aircraft, stringers, frames, etc.) per month. The sum of micro-pulse takt times equals a pulse of takt time. That is, after a number of micro-pulses equal to a full pulse, an entire unit has advanced by its length through an assembly line 110. For example, the assembly line 110 is comprised of an integer multiple of standard module work stations 114 which enable it to be designed upfront to have blank, or unused, work stations 114 at low rates and add functional work stations 114, if required for certain processes into those unused work stations 114, to accommodate higher product output in areas that are sensitive to product output.

According to FIG. 2, and referring specifically to assembly line 120, and similar to assembly line 110, each work station 124 at an assembly line 120 may be fed/supplied materials and/or components by a corresponding feeder line 149 (e.g., based on a takt time for half barrel section 127, and as illustrated in following FIG. 3), and these materials and/or components are affixed to the upper half barrel section 126 and lower half barrel section 128 being worked upon by the work stations 124. Feeder lines 149 provide additive materials/components to the work stations 124. Each feeder line 149 is designed to generate materials at a takt time in order to provide the additive material/component to a work station just-in-time (JIT) for assembly onto a larger structure (e.g., a section of fuselage), which is also pulsed at a takt time. The feeder line 149 takt time may be the same or different from the takt time of assembly line 120. That is, the feeder lines 149 deliver the components just-in-time (JIT) to the work stations 124 in an order of usage by the work stations 124. In one embodiment, the feeder lines 149 that have a takt time equal to or at a fraction of a fuselage takt time.

The takt times of the feeder lines 149, and/or the assembly lines 120 need not be the same. For instance, an upper half barrel section 126 and lower half barrel section 128 may be micro-pulsed through several work stations 124 at the same time. The upper half barrel section 126 and lower half barrel section 128 is indexed to the work stations 124 and each dedicated feeder line 149 performs Non-Destructive Inspection (NDI), window surround installation, door surround installation, window manufacturing excess trim/removal, door manufacturing excess trim/removal, installing windows and installing doors, etc. Feeder lines 149 also include output from the work stations 124, including Non-Destructive Inspection (NDI) inspection data and any excess trimmed off of upper half barrel section 126 and lower half barrel section 128. The feeder lines 149 synchronize to a pulse time (PT) or velocity of a main assembly line, to supply what is needed, when it is needed.

In a further example, the feeder line 149 provide frames 146 just-in-time (JIT) to a work station 124 that installs frames 146 onto upper half barrel section 126 and lower half barrel section 128. Likewise, feeder lines 149 provide window surrounds just-in-time (JIT) to work stations 124 where window surrounds are installed and door surrounds just-in-time (JIT) to work stations 124 where door surrounds are installed. For each feeder line 149, production times are designed based on the takt of an associated work station 124. The feeder lines 149 each serially pulse components during fabrication, and completed components arrive at each work station 124 at a common takt time. This takt time design proceeds through each of the feeder lines 149 from the smallest part to the largest final assembly.

If a takt time cannot be achieved by the assembly line 120 or feeder line 149, it is possible to adjust the work statement of particular work station 124 to reduce or increase the amount of work occurring at the particular work station 124. In a further embodiment, it is possible to add or remove a work station 124 from the assembly line 120 based upon a work statement and a desired takt time for the entirety of assembly line 120. Takt time is considered to be a number of minutes per month, divided by a number of desired units (e.g., of aircraft, stringers, frames 146, etc.) per month. The sum of micro-pulse takt times equals a full pulse of takt time. That is, after a number of micro pulses 129 equal to advancing by its length through an assembly line 120.

FIG. 2 further depicts airframe assembly regions 180 and 190, which receive the outputs of assembly lines 110 and 120 respectively. Upper half barrel sections 116, 126 and lower half barrel sections 118, 128 are joined into the various full barrel sections 44 described with respect to FIG. 1. It is important to note that upper half barrel sections 116 and lower half barrel sections 118 come in various shapes and lengths as is depicted in FIG. 2.

Joining of upper half barrel section 116 and lower half barrel section 118 occurs within joining work station 182 and joining of upper half barrel section 126 and lower half barrel section 128 occurs within joining work station 192. Join station 184 is part of work station 182, and join station 194 is part of work station 192. The full barrel sections 44 that result proceed along tracks 186 and 196, to a work cell 188 or 198. In further embodiments, the operations of the assembly lines 110, 120 discussed herein are merged into a single assembly line.

Arrows 101 indicate where differently shaped upper half barrel sections 116 and lower half barrel section 118 are moved as they exit assembly line 110 and enter airframe assembly region 180. For example, arrows 101 depict lower half barrel section 118 and upper half barrel section 116 being moved to an assembly stage 320 and assembly stage 330, respectively, and then to join station 184 for joining, and movement to different assembly lines, etc. Arrows 101 indicate where similarly shaped upper half barrel sections 126 and lower half barrel sections 128 are moved as they exit assembly line 120 and enter airframe assembly region 190. For example, arrows 101 depict lower half barrel section 128 and upper half barrel section 126 being moved to an assembly stage 321 and assembly stage 331, respectively, and then to join station 194 for joining, and movement to different assembly lines, etc.

In an embodiment, upper half barrel section 116 is joined with crown module 364 and lower half barrel section 118 is joined with cargo floor grid 324 and/or passenger floor grid 326 in assembly stages 320 and 330, respectively. Assembly stages 320 and 330 are part of the upper half barrel section 116 and lower half barrel section 118 assembly process much like assembly stages 321 and 331 are part of the upper half barrel section 126 and lower half barrel section 128 assembly process where crown modules 364, cargo floor grids 324, and passenger floor grids 326 are similarly installed. Likewise join station 184 is part of the assembly process for the upper half barrel section 116 and lower half barrel section 118 and similarly corresponds to join station 194 which is part of the assembly process for the upper half barrel section 126 and lower half barrel section 128.

FIG. 3 depicts an assembly line 150 for a component 170-1, 170-2 in a factory in an illustrative embodiment. The assembly line 150 may be utilized for any component 170-1, 170-2, such as for post-hardening or pre-hardening fabrication and/or assembly processes, and may be utilized as a feeder line 149 (FIG. 2) to provide components 170-1, 170-2 that are used by downstream assembly lines 150. The component 170-1 may be different and distinct from component 170-2 or components 170-1 and 170-2 may be exactly the same. For instance, and relevant to subsequent figures, components 170-1, 170-2 are intercostals 513, floor beams 511, or might be crown modules 364 or floor grids 365 in various stages of completion.

Component 170-1 and component 170-2 progress through serially arranged work stations 152-1 through 152-n, wherein these multiple work stations 152 perform work on component 170-1 while additional work stations 152 perform work on component 170-2 during a micro-pulse 129-3 or pause between micro-pulses 129-3. It is understood that as components move down assembly line 150 that only a single work station 152 might be performing work on a single component 170, depending on the progress of the components through the assembly line 150.

In this embodiment, the assembly line 150 includes work stations 152-1 through 152-n that perform work such as layup, inspection, hardening, trimming, pick and placement, joining, fastening, etc., as the components 170-1, 170-2 proceed along track 154. The work stations 152 perform work on the components 170-1, 170-2 such as those mentioned in the preceding paragraph during a same pause between pulses 123, 123-1 (FIG. 2) or micro pulses 129-3 (FIG. 3) of the components 170-1, 170-2 in the process direction 199.

In the illustrated embodiment, one of work stations 152-n is disposed at a gap 121 between components 170-1, 170-2 which move or pulse in the process direction 199. While disposed at the gap 121, work station 152-n receives maintenance and/or inspection, and/or technicians operating the work station 152-n may engage in a break while the work station 152-n is not performing work on one of the components 170.

In one example of the illustrated embodiment, exit line 169-1 carries inspection data 167-1 from work station 152-1 while exit line 169-2 carries removed material 167-2 from one of work stations 152-n. An example of inspection data 167-1 is the inspection data for a component 170 from a work station 152 configured as a Non-Destructive Inspection (NDI) station. Similarly, when component 170 is mechanically trimmed, the removed material 167-2 is taken away from two work stations 152-n on exit lines 169-2, the particular work stations 152-n being configured as trimming stations.

Feeder lines 160-1 through 160-n provide subcomponents 162-1 through 162-n to work stations 152-2, 152-3 and one of work station 152-n. In one example, the subcomponent 162-1 is coupled to the component 170 present in work station 152-2. The subcomponents 162-1, 162-n arrive at various work stations 152-2, 152-n, and these work stations 152-2, 152-n utilize the subcomponents 162-1, 162-n by consuming, placing, or otherwise utilizing the subcomponents 162-1, 162-n to facilitate fabrication of components 170-1, 170-2.

A path 164 is through an ingress 165-2 and egress 165-3 for each of the work stations 152, an example of which is illustrated at work station 152-2, for the components 170. In this embodiment, each feeder line 160-1, 160-n provides subcomponents 162-1, 162-n to a work station 152-1, 152-2, 152-3, 152-n, and may provide the subcomponents 162-1, 162-n via an ingress/egress port 165-1 that is independent of the path 164.

Removed material 167-2 may also be removed via independent ingress/egress ports 165-1. In one embodiment, the actions of the feeder lines 160-1, 160-n and assembly line 150 are coordinated to facilitate just-in-time (JIT) delivery of components to subsequent assembly line 150-1 to which it feeds according to a takt-time for the component 170-1, 170-2, which the work stations 152 work to. In one embodiment, the assembly line 150 is utilized for fabricating floor grids 324, 326 and feeder lines 160 provide floor grid components such as intercostals, floor beams, tracks, electrical equipment, plumbing, and floor panels. Panels are provided just-in-time (JIT) for joining into a floor grid 365.

In one embodiment, one or more of work stations 152-1, 152-2, 152-3, and 152-n comprise Non-Destructive Inspection (NDI) stations, rework stations downstream of the Non-Destructive Inspection (NDI) stations that address any out of tolerance conditions identified by NDI inspection. Many of these work stations 152-1, 152-2, 152-3, 152-n include a feeder line 160-1, 160-n devoted to the inputting of material intended for addition at that work station 152-1, 152-n. The assembly line 150 is representative of one or all of assembly line 110, assembly line 120, assembly region 180, and assembly region 190. As further described herein, the assembly line 150 can also be representative of assembly stages 320, 321, 330, and 331.

Figure 4:
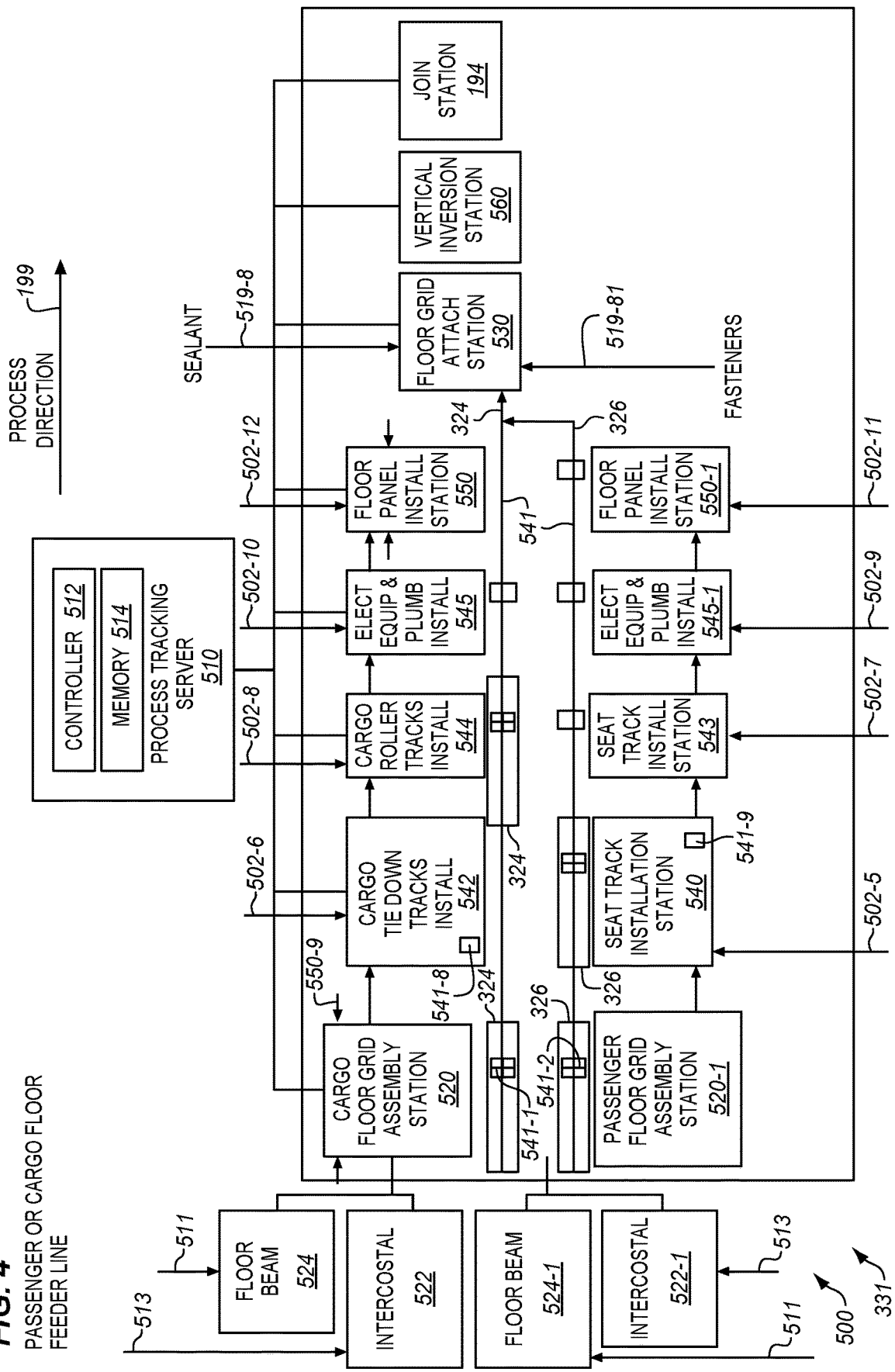
FIG. 4 is a block diagram of a floor grid assembly line for installing floor grids into lower sections of fuselage in an illustrative embodiment.

FIG. 4 is a block diagram of a floor grid assembly line for installing floor grids into lower sections of fuselage in an illustrative embodiment. FIG. 4 is a block diagram of an assembly line 500 for fabricating and installing floor grids 365 (FIG. 5), specifically passenger floor grids 326 and cargo floor grids 324 into a lower half barrel section 128 in an illustrative embodiment. Specifically, FIG. 4 depicts a line of serially arranged assembly cells with full pulses between each. The cargo floor grids 324 and passenger floor grids 326 are separately advanced via tracks 541, and as work progresses are respectively, indexed to work stations 520, 520-1, 540, 542, 543, 544, 545, 545-1, 550, 550-1 via indexing component 541-1, 541-2 coupled to each respective cargo floor grid 324 and passenger floor grid 326. As depicted, the plurality of work stations comprises a plurality of work stations configured in two parallel lines, a first portion of the work stations for assembling passenger floor grids 326, and a second portion of the work stations for assembling cargo floor grids 324. The track 541 comprises two tracks, a first track operable for fabrication of a cargo floor grid 324, a second track operable for fabrication of a passenger floor grid 326; and the plurality of work stations comprises a first work station associated with the first track, and a second work station associated with the second track. Though shown only on work stations 540, and 542, each of the work stations 520, 520-1, 540, 542, 543, 544, 545, 545-1, 550, and 550-1 are coupled to an indexing unit 541-8, 541-9. Cargo floor grids 324 and passenger floor grids 326 are indexed to work stations 520, 520-1, 540, 542, 543, 544, 545, 545-1, 550, and 550-1 via indexing components 541-1, 541-2 being interfaced to indexing unit 541-8, 541-9 in a manner similar to that described elsewhere herein. Indexing units 541-8, 541-9 are associated with each of the plurality of work stations, the indexing units 541-8, 541-9 operable to interface to an indexing unit 541-1, 541-2 associated with the floor grid 365 to control a position of the floor grid 365 with respect to the work station.

As shown, multiple of each of cargo floor grid 324 and passenger floor grid 326 are shown on tracks 541 and it is possible that a cargo floor grid 324 is at each one of work stations 520, 542, 544, 545, and 550. Similarly, it is possible that a passenger floor grid 326 is at each one of work stations 520-1, 540, 543, 545-1, and 550-1. An embodiment has a cargo floor grid 324 and passenger floor grid 326 at each of work stations 520, 520-1, 540, 542, 543, 544, 545, 545-1, 550, 550-1 and full pulsing to the next work station. As shown in FIG. 4, the floor grid assembly line 500 includes a process tracking server 510, which utilizes a controller 512 and a memory 514 to track the progress of floor grids 365 through assembly stage 331.

In this embodiment, the assembly line 500 includes a floor beam assembly feeder line 524-1, 524 which fabricates floor beams, including pre-cure and post-cure, for a floor grid 365, specifically passenger floor grid 326 and cargo floor grid 324, respectively. An intercostal feeder line 522-1, 522 fabricates intercostals 513, including pre-cure and post-cure, for a floor grid 365, specifically passenger floor grid 326 and cargo floor grid 324, respectively. The intercostal feeder lines 522-1, 522 and floor beam assembly feeder lines 524-1, 524 feed intercostals 513 and floor beams 511 to floor grid assembly stations 520, 520-1 for installation passenger floor grid 326 and cargo floor grid 324, respectively. These components are assembled together in a floor grid assembly station 520, 520-1.

Figure 6:
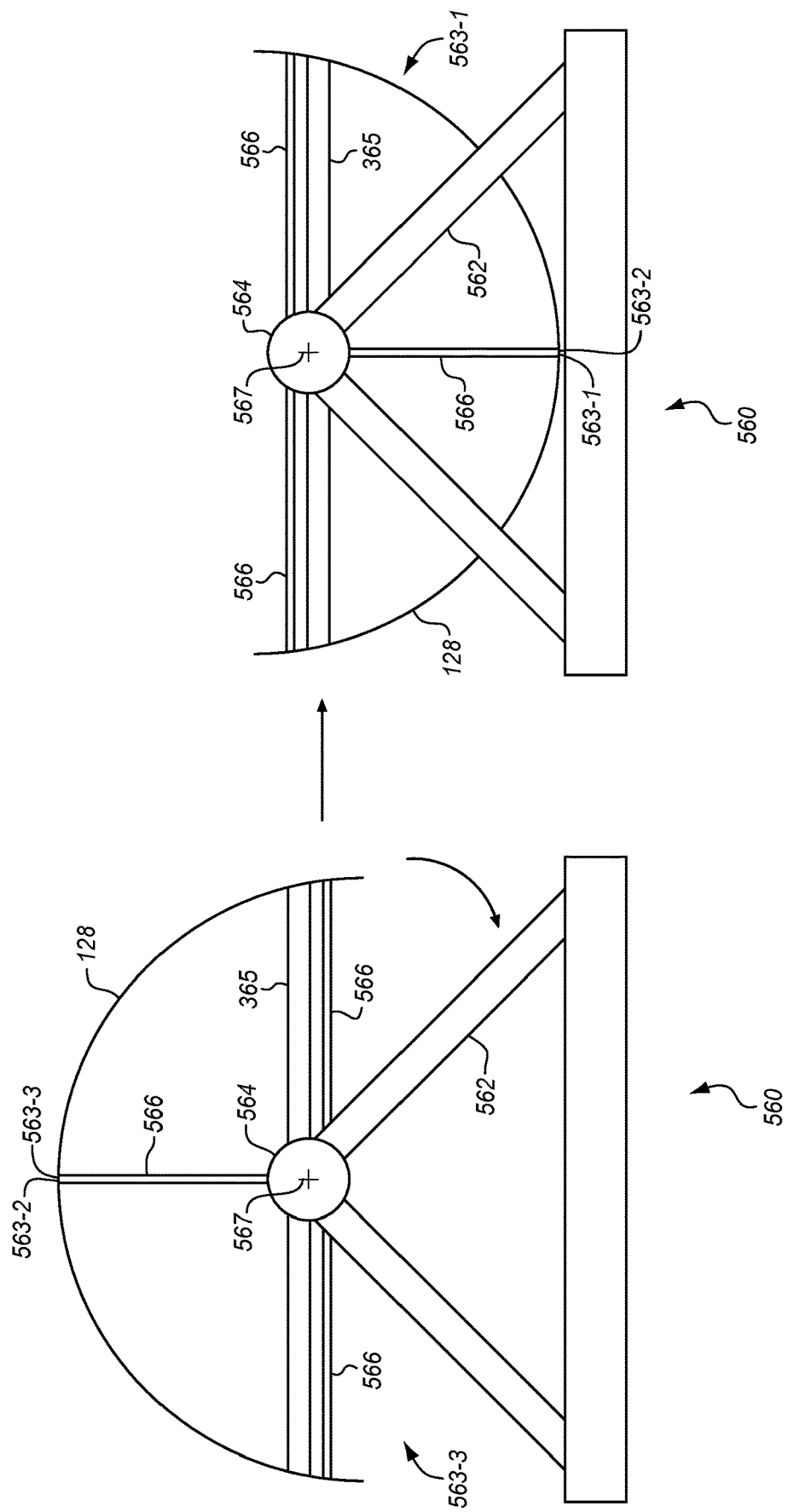
FIG. 6 depicts inversion of a lower section of fuselage in an illustrative embodiment.

Unlike prior systems in which the floor grid 365 was assembled while being installed into a full barrel section 44, FIG. 4 depicts how the floor grid 365, particularly cargo floor grid 324 and passenger floor grid 326, can be assembled in full pulses, and installed in a completed state. This is possible through the reception of floor grid components from feeder lines 502, that are assembled together prior to install into the inverted lower half barrel section 128. Each feeder line 502 is operable to supply floor grid components to an associated one of the work stations. The lower half barrel section 128 is then inverted into a keel down orientation 563-1 (FIG. 6). Floor panel installation station 550, 550-1 installs floor panels from feeder lines 502-11, 502-12 into the lower half barrel section 128 while the lower half barrel section 128 is inverted, although installation of a cargo floor and passenger floor may be accomplished via different assemblies.

To clarify, the floor grids 365, particularly passenger floor grid 326 and cargo floor grid 324, are assembled in parallel and installed in a completed state or a slightly less than completed state into the lower half barrel section 128 prior to the inverting of the lower half barrel section 128 into a keel down orientation 563-1.

The passenger floor grid 326 and cargo floor grid 324 are assembled in parallel to each other and in parallel to the lower half barrel section 128 (as shown in FIG. 2). Each of the passenger floor grids 326 and cargo floor grids 324 begin the fabrication process in a full pulse with assembling floor beams and intercostals in cargo floor grid assembly stations 520 and passenger floor grid assembly station 520-1. The work stations 520, 520-1 index to the passenger floor grids 326 and/or cargo floor grids 324 as it advances through assembly line 500 during pauses between full pulses or during full pulses. The passenger floor grids 326 and/or cargo floor grids 324 are indexed to each of the arranged work stations 520, 520-1 to convey a 3D characterization of the passenger floor grids 326 and/or cargo floor grids 324, within the purview 550-9 of the work stations 520, 520-1 prior to beginning station work upon the passenger floor grids 326 and/or cargo floor grids 324. Indexing components 541-1, 541-2, similar to indexing components 115 described elsewhere herein, may be on several portions of the floor grid 365 or on several portions of a moveable jig conveying the floor grid 365.

Next, cargo floor grids 324 and passenger floor grids 326 of assembled floor beams and intercostals are then full pulsed and indexed to cargo tie down tracks installation station 542 and seat track installation station 540, respectively. Cargo tie down materials are delivered just-in-time (JIT) to cargo tie down tracks installation station 542 via feeder line 502-6. Seat track materials are delivered just-in-time (JIT) to seat track installation station 540 via feeder line 502-5. Then, cargo floor grids 324 and passenger floor grids 326 are then full pulsed and indexed to cargo roller tracks installation station 544 and another seat track installation station 543, respectively. Seat track installation station 540, cargo roller tracks installation station 542, and another seat track installation station 543 are sometimes referred to together generically herein as a track installation station.

Cargo roller track materials are delivered just-in-time (JIT) to cargo roller tracks installation station 544 via feeder line 502-8. Seat track materials are delivered Just-in-time (JIT) to seat track installation station 543 via feeder line 502-7. Then, cargo floor grids 324 and passenger floor grids 326 are then full pulsed and indexed to electrical equipment and plumbing installation stations 545, 545-1, respectively. Electrical equipment and plumbing are delivered just-intime (JIT) to electrical equipment and plumbing installation station 545 via feeder line 502-10. Electrical equipment and plumbing are delivered just-in-time (JIT) to electrical equipment and plumbing installation station 545-1 via feeder line 502-9.

Finally, cargo floor grids 324 and passenger floor grids 326 are then full pulsed and indexed to floor panel installation stations 550, 550-1, respectively. Floor panels are delivered just-in-time (JIT) to floor panel installation station 550 via feeder line 502-12. Floor panels are delivered just-in-time (JIT) to floor panel installation station 550-1 via feeder line 502-11. Optionally, the cargo floor grids 324 and passenger floor grids 326 do not go through floor panel installations station 550, 550-1 and forego floor panel installation and instead advances directly to floor grid attach station 530. In this embodiment, the floor panels are installed during cargo floor grid 324 and passenger floor grid 326 installation into lower half barrel section 128. The cargo floor grid 324 arrives at floor grid attach station 530 and is installed inverted into inverted lower half barrel section 128 first. Then the passenger floor grid 326 arrives at floor grid attach station 530 and is installed inverted into lower half barrel section 128 thereafter. Sealant and fasteners are provided to floor grid attach station 530 in a JIT fashion delivering just what is needed on feeder lines 519-8, 519-81, respectively. Lower half barrel section 128 is then advanced in process direction 199 to inversion station 560 and then to join station 194.

FIG. 5 is a block diagram of a floor grid assembly line for installing floor grids into lower sections of fuselage in an illustrative embodiment. As depicted in FIG. 5 and discussed below, passenger floor grids 326 and cargo floor grids 324 are advanced by micro-pulse 129-1 through assembly work stations 504-1 through 504-7 and 504-11 through 504-17, respectively, to arrive at floor grid attach station 530 as part of floor grid 365 installation into a lower half barrel section 128 in a full pulse. The passenger floor grids 326 are advanced by micro-pulse 129-1 at a takt through assembly work stations 504-1 through 504-7. The cargo floor grids 324 are advanced by micro-pulse 129 at a (same or different) takt through assembly work stations 504-11 through 504-17. The floor grid 365 has two assemblies, the cargo floor grid 324 and passenger floor grid 326. The cargo floor grid 324 and passenger floor grid 326 are assembled in parallel for the lower half barrel section 128 so that the completed floor grid 365 arrives for installation to minimize the lower half barrel section 128 time within floor grid attach station 530.

The cargo floor grid 324 is installed into the lower half barrel section 128 first and then the passenger floor grid 326 is installed. This means that the passenger floor grid 326 is received in floor grid attach station 530 just after the cargo floor grid 324 is installed. The passenger floor grids 326 and the cargo floor grids 324 have to be assembled in parallel to the lower half barrel section 128 to minimize the time for the floor grid 365 attachment in the floor grid attach station 530. The passenger floor grids 326 and the cargo floor grids 324 are both assembled inverted. The cargo floor grid 324 arrives at the floor grid attach station 530 ready for installation in a completed state, or in a slightly less than completed state.

The cargo floor grid 324 is assembled from floor beams 511 with intercostals 513 and then cargo tie down tracks 515 are added, as are cargo roller tracks 516 and floor panels 517 and electrical equipment and plumbing 518. The cargo floor grid 324 is assembled from floor beams 511 with intercostals 513. Next, cargo tie down tracks 515, cargo roller tracks 516, floor panels 517, electrical equipment and plumbing 518 are added prior to installing the cargo floor grid 324 into the lower half barrel section 128.

The cargo floor grid 324 begins assembly by micro pulses 129-1 through serially arranged work stations 504-11, 504-12, 504-13 on feeder line 503-1 each with feeder lines 519-1, 519-2, 519-3, respectively, delivering floor beams 511 and intercostals 513 just-in-time (JIT) delivery of just the right part to work stations 504-11, 504-12, 504-13 for assembly into cargo floor grid 324. Micro pulse 129-1 is illustrate as having a length equal to the space between two adjacent work stations 504-11 through 504-17 or equal to the purview 504-18 or some multiple or fraction thereof. The cargo floor grid 324 continues assembly on feeder line 503-1 by micro pulses 129-1 through serially arranged work stations 504-14, 504-15, 504-16, 504-17 each with feeder lines 519-4, 519-5, 519-6, 519-7 delivering just-in-time (JIT) just the right part of cargo tie down tracks 515, cargo roller tracks 516, electrical equipment and plumbing 518, floor panels 517, respectively, for assembly into cargo floor grid 324.

The work stations 504-11 through 504-17 index to the cargo floor grid 324 as it advances through the floor grid feeder line 503-1, during pauses between micro pulses 129-1 and/or during micro pulses 129-1 of the cargo floor grid 324. The cargo floor grid 324 is indexed to each of the serially arranged work stations 504-11 through 504-17 singularly or in multiples to convey a 3D characterization of the cargo floor grid 324 within the purview 504-18 of each work station 504-11 through 504-17 prior to work station 504-11 through 504-17 work upon the cargo floor grid 324. One or more work stations 504-11 through 504-17 perform work upon the cargo floor grid 324 during pauses between micro pulses 129-1 and/or during micro pulse 129-1. Indexing components 541-1 may be on several portions of the floor grid 324 or on several portions of a moveable jig conveying the cargo floor grid 324.

The cargo floor grid 324 is assembled in parallel to the lower half barrel section 128 and arriving just-in-time (JIT) at a at the floor grid attach station 530 for inverted installation into the lower half barrel section 128 prior to inverting the lower half barrel section 128 into a keel down orientation 563-1. Each of feeder lines 519-1, through 519-7 are shown as the ends of an assembly/fabrication line that fabricates floor beams 511, intercostals 513, cargo tie down tracks 515, cargo roller tracks 516, electrical equipment and plumbing 518, floor panels 517, respectively, for just-in-time (JIT) delivery of just the right part to work stations for addition to cargo floor grid 324. In the illustration a second cargo floor grid 324 is a subsequent assembly progressing after the first cargo floor grid 324 through feeder line 503-1.

When disposed within the gap 121-1, work stations 504-11 through 504-17 receive maintenance and/or inspection, and/or technicians operating the work stations 504-11 through 504-17 go on break and/or perform maintenance while the work stations 504-11 through 504-17 are not performing work on cargo floor grid 324. While seven work stations 504-11 through 504-17 and feeder lines 519-1 through 519-7 are shown any number of work stations or feeder lines 519 are possible during fabrication of cargo floor grid 324.

The passenger floor grid 326 begins assembly by micro pulses 129-2 through serially arranged work stations 504-1, 504-2, 504-3 on feeder line 503 each with feeder lines 519-11, 519-21, 519-31, respectively. Floor beams 511-1 and intercostals 513-1 are delivered just-in-time (JIT) with just the right part to work stations 504-1, 504-2, 504-3 for assembly into passenger floor grid 326. Micro pulse 129-2 is illustrated as having a length equal to the space between two adjacent work stations 504-1 through 504-7 or equal to the purview 504-8 or some multiple or fraction thereof.

The passenger floor grid 326 continues assembly on feeder line 503 by micro pulses 129-2 through serially arranged work stations 504-4, 504-5, 504-6, 504-7 each with feeder lines 519-41 through 519-71 delivering just-in-time (JIT) just the right part of cargo tie down tracks 515-1, cargo roller tracks 516-1, electrical equipment and plumbing 518-1, floor panels 517-1, respectively, for assembly into passenger floor grid 326. The work stations 504-1 through 504-7 index to the passenger floor grid 326 as it advances through the floor grid feeder line 503, during pauses between micro pulses 129-2 and/or during micro pulses 129-2 of the passenger floor grid 326. Using indexing components 541-2, the passenger floor grid 326 is indexed to each of the serially arranged work stations 504-1 through 504-7 singularly or in multiples to convey a 3D characterization of the passenger floor grid 326 within the purview 504-8 of each work station 504-1 through 504-7 prior to work station 504-1 through 504-7 work upon the passenger floor grid 326.

One or more work stations 504-1 through 504-7 perform work upon the passenger floor grid 326 during pauses between micro pulses 129-2 and/or during micro pulse 129-2. Indexing components 541-2 may be on several portions of the passenger floor grid 326 or on several portions of a moveable jig conveying the passenger floor grid 326. The passenger floor grid 326 is assembled in parallel to the lower half barrel section 128 and arriving just-in-time (JIT) at the floor grid attach station 530 for inverted installation into the lower half barrel section 128 prior to inverting the lower half barrel section 128 into a keel down orientation 563-1. Each of feeder lines 519-11, through 519-71 are shown as the ends of an assembly fabrication line that fabricates floor beams 511-1, intercostals 513-1, cargo tie down tracks 515-1, cargo roller tracks 516-1, electrical equipment and plumbing 518-1, floor panels 517-1, respectively, for just-in-time (JIT) delivery of just the right part to work stations for addition to passenger floor grid 326. A second passenger floor grid 326 is illustrated and is a subsequent assembly progressing after the first passenger floor grid 326 through feeder line 503.

While disposed at the gap 121-2, work station 504-4 receives maintenance and/or inspection, and/or technicians operating the work station 504-4 go on break and/or perform maintenance while the work station 504-4 is not performing work on passenger floor grid 326. While seven work stations 504-1 through 504-7 and feeder lines 519-11 through 519-71 are shown any number of work stations or feeder lines are possible during fabrication of passenger floor grid 326.

FIG. 5 also has the passenger floor grid 326 advanced by micro-pulse 129-2 through assembly work stations 504-1 through 504-7 to arrive at floor grid attach station 530 for floor grid installation into a lower half barrel section 128 in a full pulse. As previously described herein, a floor grid 365 has two assemblies, the cargo floor grid 324 and passenger floor grid 326. The cargo floor grid 324 and passenger floor grid 326 are assembled in parallel to and for the lower half barrel section 128 so that the components of the floor grid 365 arrive for installation to minimize the time the lower half barrel section 128 is in floor grid attach station 530. Feeder lines 503, 503-1 for the passenger floor grid 326 and cargo floor grid 324, respectively, for floor grid attach station 530, provide assembled and inverted passenger floor grid 326 and cargo floor grid 324 to floor grid attach station 530 just-in-time (JIT) and ready for inverted installation into the inverted lower half barrel section 128.

The cargo floor grid 324 is installed into the lower half barrel section 128 first and then the passenger floor grid 326 is installed. This means that the passenger floor grid 326 is received in floor grid attach station 530 just after the cargo floor grid 324 is installed. The passenger floor grids 326 and the cargo floor grid 324 have to be assembled in parallel to the lower half barrel section 128 to minimize the time for floor grid attachment in the floor grid attach station 530. The passenger floor grid 326 and the cargo floor grid 324 are both assembled inverted. The cargo floor grid 324 arrives at the floor grid attach station 530 ready for installation.

The cargo floor grid 324 and passenger floor grid 326 feeder lines 503, 503-1 are advanced by pulse or micro pulse 129-1, 129-2. In an embodiment, the cargo floor grid 324 and passenger floor grid 326 optionally forego floor panel 517, 517-1 installation in feeder lines 503, 503-1 and instead are installed during cargo floor grid 324 and passenger floor grid 326 installation into lower half barrel section 128. The cargo floor grid 324 arrives at floor grid attach station 530 and is installed inverted into inverted lower half barrel section 128 first. Then, the passenger floor grid 326 arrives at floor grid attach station 530 and is installed inverted into lower half barrel section 128 thereafter. Sealant and fasteners are provided via feeder lines 519-8, 519-81 to floor grid attach station 530 in a just-in-time (JIT) fashion delivering just what is needed on feeder lines 519-8, 519-81, respectively. Lower half barrel section 128 is then advanced in process direction 199 to inversion station 560 and then to join station 194.

FIG. 6 illustrates inversion of a lower section of fuselage in an illustrative embodiment. As shown in FIG. 6, vertical inversion station 560 rotates the lower half barrel section 128 about a longitudinal center line 567 to place it in a keel down orientation 563-1. More specifically, FIG. 6 depicts inversion of a lower half barrel section 128 in an illustrative embodiment. In FIG. 6, a vertical inversion station 560 includes a frame 562, to which a rotary element 564 is attached. The lower half barrel section 128 is rotated about a longitudinal center line 567 prior to joining to the upper half barrel section 126 (shown in FIG. 7). Struts 566 protrude from the rotary element 564 and are attached to lower half barrel section 128, in which one or more floor grids 365 have been installed. The rotary element 564 then rotates, inverting a keel 563-2 of the lower half barrel section 128 from a keel up orientation 563-3 to a keel down orientation 563-1 and arranging the lower half barrel section 128 in position for joining to upper half barrel section 126 in join station 194.

As described elsewhere herein, a join station 194 unites the lower half barrel section 128 to an upper half barrel section 126. This joining process results in the upper half barrel section 126 and the lower half barrel section 128 being longitudinally spliced together, including splicing the skin and the frames 146 and any surrounds thereat. A splice plate (not shown) may be installed entirely in the join station 194.

Figure 7:
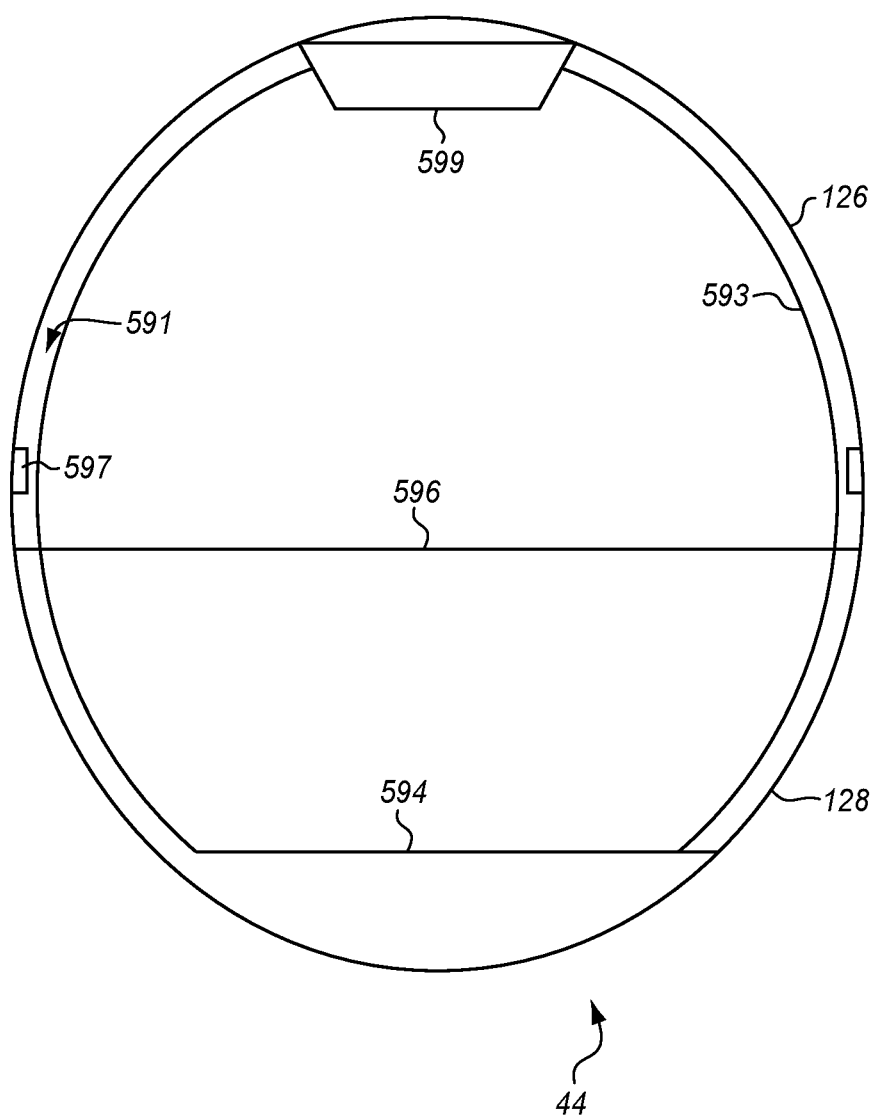
FIG. 7 depicts a cross section of a fuselage in an illustrative embodiment.

FIG. 7 illustrates a cross section of a fuselage in an illustrative embodiment. In FIG. 7, a cross-section of a full barrel section 44 in join station 194 (FIG. 4) is depicted, which includes a cargo floor grid 594 and a cabin floor grid 596. FIG. 7 further illustrates that a crown module 599 and doubler 597 have been added to the full barrel section 44 of fuselage. In one embodiment, the crown module 599 includes stow bins and interior lighting, and these details are not shown in FIG. 7 for the sake of clarity. Insulation 591 and interior panels 593 are also shown as being installed.

Figure 8:
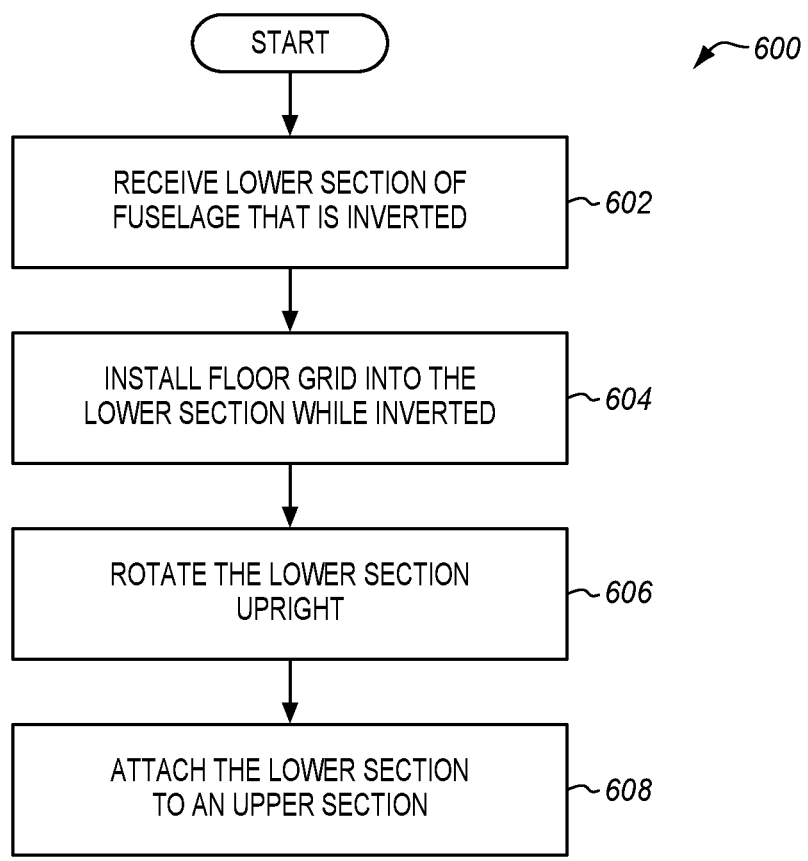
FIG. 8 is a flowchart depicting a method for utilizing the floor grid assembly line of FIG. 4 in an illustrative embodiment.

FIG. 8 is a flowchart depicting a method 600 for utilizing the floor grid assembly lines 500 and 500-1 of FIGS. 4 and 5, respectively, in an illustrative embodiment. The method 600 includes receiving 602 a lower section of a fuselage 12 that is inverted. In some illustrative examples, the method 600 includes receiving a lower half barrel section 128 of a fuselage 12 that is inverted to a keel-up orientation 563-3. In some illustrative examples, the method 600 includes receiving 602 a lower half barrel section 128, or other arcuate section, in a keel up orientation 563-3. Method 600 further comprises installing 604 a floor grid 365 into the lower section while inverted. In some illustrative examples, method 600 further comprises installing 604 a floor grid 365 into the lower half barrel section 118 while inverted. In some illustrative examples, method 600 further comprises installing 604 a cargo floor grid 324 and then passenger floor grid 326 into the lower half barrel section 128 while the lower half barrel section 128 is in a keel up orientation 563-3. In one embodiment, the lower half barrel section 128 is disposed in the assembly stage 330 for about twice as long as upper half barrel section 126 is within assembly stage 320. That said, the upper half barrel sections 126 and lower half barrel sections 128, by definition, have to have the same takt-time. In other words, both an upper half barrel section 126 and a lower half barrel section 128 are needed within the time interval demanded by a customer. Continuing, the amount of work to fabricate and process the lower half barrel section 128 could be more or less than the amount of work to fabricate and process the upper half barrel section 126, but the takt-time is the same and is addressed in the upfront design of the assembly line 110, 120.

Plumbing and electrical systems along with insulation and wall panels not in the join region are added in assembly stage 330 before the lower half barrel section 128 is inverted into a keel down orientation 363-1. Method 600 continues by rotating 606 the lower half barrel section 128 into a keel down orientation 363-1, and attaching 608 the lower half barrel section 128 to an upper half barrel section 126 in order to form a full barrel section 44. This operation may be performed, for example, during a full pulse. In some illustrative examples, method 600 includes rotating 606 the lower section upright. In some illustrative examples, Method 600 continues by attaching the lower section to an upper section.

In further embodiments, the lower half barrel section 128 is advanced in a process direction 199 before it receives what is produced by the floor grid assembly line 500, and lower half barrel section 128 is advanced in the process direction 199 after installing the floor grid 365, and is further advanced in the process direction 199 after being rotated.

Method 600 provides a technical benefit by enabling lower half barrel sections 128 to be processed and receive floor grids 365 while they remain inverted, which eliminates the need for rotating the lower half barrel sections 128 until they are to be joined to corresponding upper half barrel sections 126. This reduces the need for specialized equipment at the factory floor. A further benefit is that prior to inverting, the technicians can work off of stands mounted to a shop floor or directly on the shop floor without the difficulties of installing a cargo or passenger floor while positioning technician support areas in the same space as the floor is installed in a keel down orientation 563-1. This is an example of bringing the work to the tool, tooling and technicians. The keel up orientation 563-3 permits a more comfortable floor grid 365 installation position for the tool, tooling and technicians.

Figure 9:
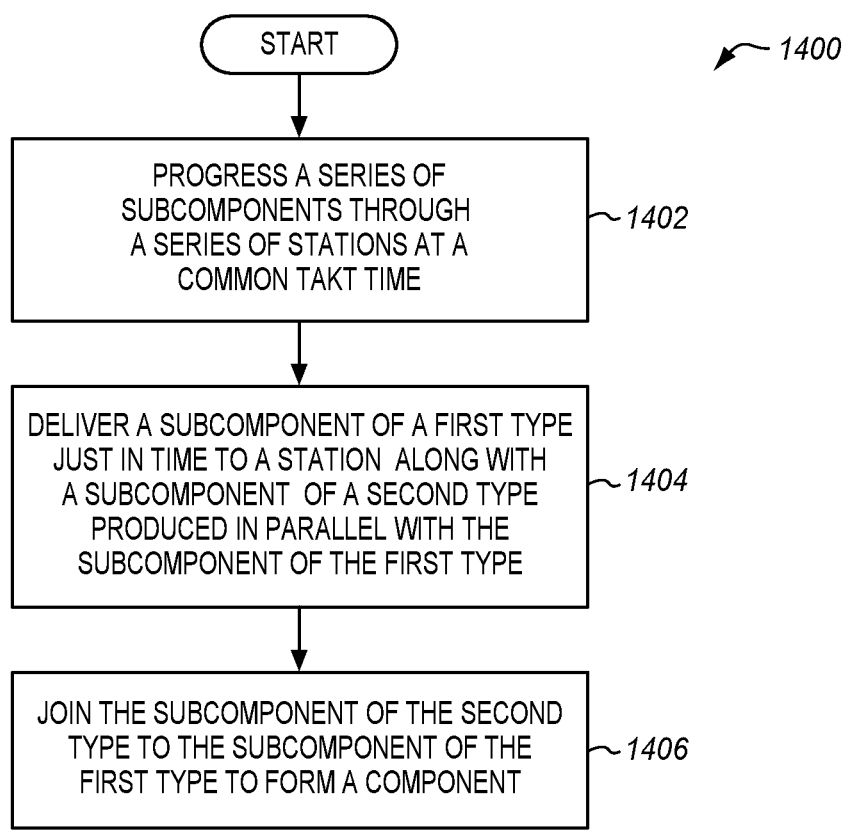
FIG. 9 is a flowchart illustrating a method of takt time assembly in an illustrative embodiment.

FIG. 9 is a flowchart illustrating a method 1400 of takt time assembly in an illustrative embodiment. Method 1400 includes progressing 1402 a series of subcomponents 162 (162-1 through 162-n) through a series of stations 152 at a common takt time. In some illustrative examples, the stations may be referred to as fabrication stations or work stations. In one embodiment, the subcomponents 162 are delivered according to the common takt time. Thus, the deliveries are provided just-in-time (JIT) from a feeder line 160, and each feeder line 160 may have a common takt time or not. The feeder lines 160 may have their own takt time, and this takt time may be equal to a fraction of a fuselage takt time, or not.

The term takt-time needs further explanation. For example, and with reference to FIG. 3, there is a Takt Time of Product (TTP) for each assembly line 150, as well as for each feeder line 160. The description applies to the other figures described herein, for example assembly lines 110, 120, and feeder lines 149. Often the takt times are the same but can be different, as feeder lines 160 always need to be synchronized with assembly lines 150. For example, if there was only one assembly line 150 and there were eight half barrel sections 117 going down assembly line 150, combined with a product demand requiring eight half barrel sections 117 every 32 available hours, the Takt Time of Product (TTP) for the assembly line 150 is 4 hours. The Takt Time of Product (TTP) is equal to the pulse time (PT) only when the pulse length is the full length of the product produced. In case of a micro-pulsed line, where pulse length is a fraction of full product length, gaps 121 between products have to be accounted for, and the pulse time (PT) is much less. All feeder lines 160 need to support mainline Takt Time of Product (TTP), pulse time (PT), or velocity. As an additional example, if pulse length was equal to a frame pitch 147 (around 2 feet), then a frame feeder line would need to deliver a number of frames 146 (e.g., two) per frame station. On some half barrel sections 117 there may be no doors, so the feeder line 160 needs to supply two frames 146 every pulse time (PT). Some half barrel sections 117 include doors and in those areas, frames 146 are not needed for at least a few micro-pulses. However, feeder lines 160 still have to synchronize to assembly line 150 pulse time (PT). The feeder lines 160 can have greater Takt Time of Product (TTP) if the number of products per pulse is greater than one and with only one feeder line 160. If number of products is greater than one and the number of feeder lines 160 for that product is same as the number of products in feeder line 160, then pulse time (PT) of feeder line 160 is the same as that of the assembly line 150. When there is no need to supply feeder products to assembly line 150, then pulse time (PT) is variable for the feeder line 160.

At the feeder lines 160, additional work stations 152 perform work on subcomponents 162 during a pause between pulses of the subcomponents 162 in a process direction 199. Some subcomponents 162 may be produced in a continuous non-pulsed, non-micro-pulsed fashion. Method 1400 includes delivering 1404 a subcomponent 162-1 of a first type just-in-time (JIT) to a work station 152-2 along with a subcomponent 162-n of a second type produced in parallel with the subcomponent 162-1 of the first type. The subcomponents 162 are delivered to the work stations just-in-time (JIT) in an order of usage. Method 1400 includes joining 1406 the subcomponent 162-n of the second type to the subcomponent 162-1 of the first type to form a component 170-1. In one embodiment, the subcomponent 162 is a section (e.g., an upper section 126 or a lower section 128) of a fuselage. In a further embodiment, the component 170-1 is a full barrel section 44 formed from an upper half barrel section 126 and a lower half barrel section 128.

In further embodiments, the method 1400 further includes simultaneously performing work on the subcomponents 162 via more than one of the work stations 152. Depending on the embodiments, progressing comprises iteratively pulsing the subcomponents 162 by less than their length, then pausing while work is performed on the subcomponents 162. Alternatively, progressing comprises iteratively pulsing the subcomponents 162 at least their length, then pausing while work is performed on the subcomponents 162. Alternatively, progressing comprises continuously moving the subcomponents 162 while work is performed on the subcomponents 162. In pulsed embodiments, the first type of subcomponent 162-1 and the second type of subcomponent 162-n are joined into the component 170 at a work station 152 after a pulse.

Figure 10:
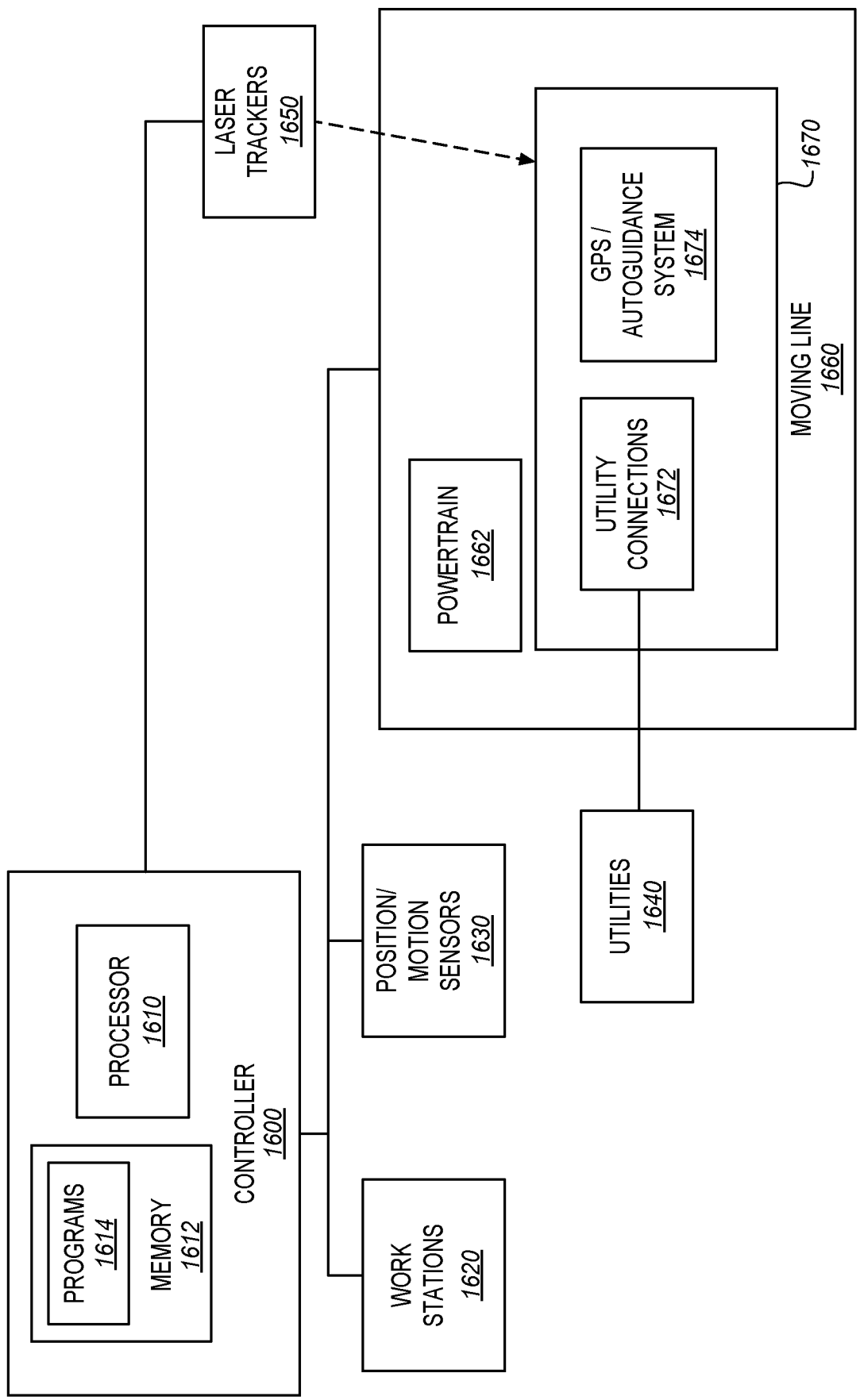
FIG. 10 broadly illustrates control components of a production system in an illustrative embodiment.

Attention is now directed to FIG. 10, which broadly illustrates control components of a production system (e.g., assembly environment 100) that performs continuous manufacturing. A controller 1600 coordinates and controls operation of work stations 1620 (corresponds to any and all of work stations 114, 124, 504-1 through 504-7 and 504-11 through 504-17, and movement of one or more of the aircraft components described herein) along a moving line 1660 having a powertrain 1662. The controller 1600 may comprise a processor 1610 which is coupled with a memory 1612 that stores programs 1614. In one example, the mobile platforms 1670 are driven along a moving line 1660 that is driven continuously by the powertrain 1662, which is controlled by the controller 1600. In this example, the mobile platform 1670 includes utility connections 1672 which may include electrical, pneumatic and/or hydraulic quick disconnects that couple the mobile platform 1670 with externally sourced utilities 1640. In other examples, as previously mentioned, the mobile platforms 1670 comprise Automated Guided Vehicles (AGVs) that include on board utilities, as well as a GPS/autoguidance system 1674. Mobile platforms 1670 also include some or all of the indexing systems, bar codes and Radio Frequency Identifier (RFID) systems previously discussed. In still further examples, the movement of the mobile platforms 1670 is controlled using laser trackers 1650. Trackers 1650 use indexing units, bar code readers or Radio Frequency Identifier (RFID) readers. Position and/or motion sensors 1630 coupled with the controller 1600 are used to determine the position of the mobile platforms 1670 as well as the powertrain 1662.

Figure 11:
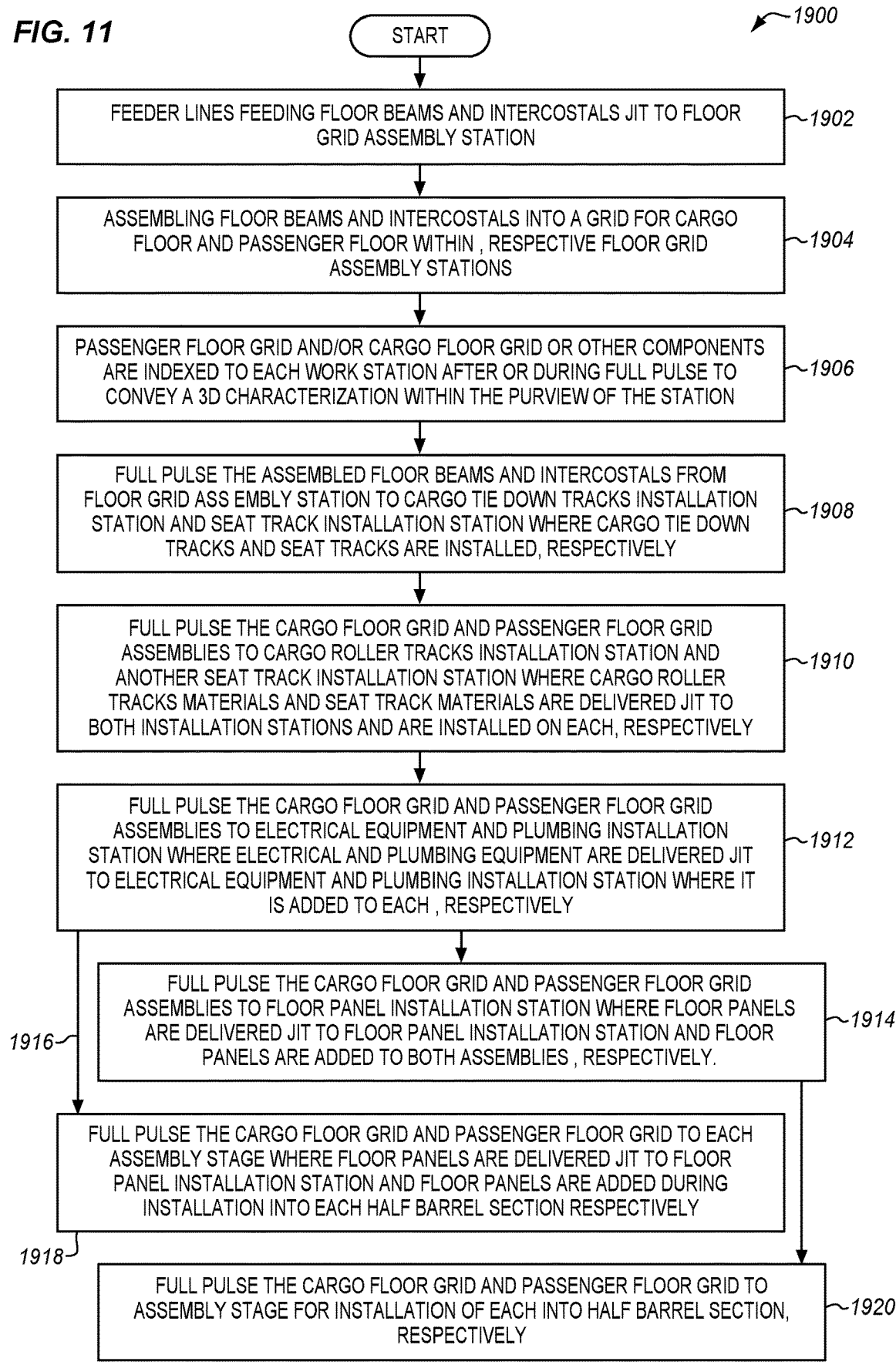
FIG. 11 is a flowchart illustrating a method of fabricating a floor grid in an illustrative embodiment.

FIG. 11 is a flowchart illustrating a method of fabricating a floor grid in an illustrative embodiment. FIG. 11 is a flowchart illustrating a method 1900 of assembly lines 500, 500-1 for installing floor grids 365, specifically passenger floor grid 326 and cargo floor grid 324 into lower half barrel section 128, as illustrated in FIG. 4. Method 1900 includes feeder lines feeding 1902 floor beams 511 and intercostals 513 to floor grid assembly station 520. In some illustrative examples, method 1900 includes feeder lines feeding 1902 floor beams 511 and intercostals 513 just-in-time (JIT) to floor grid assembly station 520. In some illustrative examples, method 1900 includes feeding 1902 floor beams 511, intercostals 513, and tracks 515, 516 to work stations via a feeder line 502 associated with each work station. The method 1900 includes feeding floor beams 511 and intercostals 513 to floor beam assembly feeder lines 524, 524-1 and intercostal feeder lines 522, 522-1, respectively, and on to floor grid assembly station 520 in floor grid assembly line 500 of FIG. 4 to assemble 1904 a cargo floor grid 324 and passenger floor grid 326, respectively. Method 1900 includes assembling 1904 the floor beams 511, intercostals 513, and tracks 515, 516 together into a floor grid 365. Method 1900 includes assembling 1904 floor beams 511 and intercostals 513 into a grid 324, 326 for cargo floor 594 and passenger floor 596 within respective floor grid assembly stations 520, 520-1.

Method 1900 includes indexing the passenger floor grid 326 and/or cargo floor grid 324 or other components are indexed to each work station after or during full pulse to convey a 3D characterization within the purview of the work station. Passenger floor grid 326 and/or cargo floor grid 324 or other subcomponents 162 are indexed 1906 to each work station after or during pulse to convey a 3D characterization within the purview of the work station. The passenger floor grid 326 and/or cargo floor grid 324 are indexed 1906 to each of the serially arranged work stations 504 to convey a 3D characterization of the passenger floor grid 326 and/or cargo floor grid 324 within the purview 504-8, 504-18 of the work station prior to beginning station work upon the passenger floor grid 326 and/or cargo floor grid 324.

Next, the assembled floor beams 511 and intercostals 513 from floor grid assembly station 520 are full pulsed 1908 to cargo tie down tracks installation station 542 and seat track installation station 540 where cargo tie down tracks and seat tracks are installed, respectively, as described herein.

Method 1900 includes full pulsing 1910 the cargo floor grid 324 and passenger floor grid 326 assemblies to cargo roller tracks installation station 544 and another seat track installation station 543 where cargo roller track materials and seat track materials are delivered JIT to both installation stations 543, 544 and are installed on each, respectively. Continuing, cargo floor grid 324 and passenger floor grid 326 assemblies are then full pulsed 1910 to cargo roller tracks installation station 544 and another seat track installation station 543 where cargo roller track materials and seat track materials are installed, respectively, as described herein.

The cargo floor grid 324 and passenger floor grid 326 assemblies are full pulsed 1912 to electrical equipment and plumbing installation stations 545, 545-1 where electrical and plumbing equipment are delivered JIT to electrical equipment and plumbing installation station 545, 545-1 where it is added to each, respectively.

Continuing with method 1900, the cargo floor grid 324 and passenger floor grid 326 assemblies are full pulsed 1914 to floor panel installation station 550, 550-1 where floor panels are delivered JIT to floor panel installation station and floor panels are added to both assemblies, respectively.

Optionally, the cargo floor grid 324 and passenger floor grid 326 does not go through floor panel installations station 550, 550-1 and foregoes floor panel 517, 517-1 installation and instead advances 1916 directly to floor grid attach station 530, respectively.

When method 1900 advances 1916 directly to floor grid attach station 530, method 1900 includes full pulsing 1918 the cargo floor grid 324 and the passenger floor grid 326 to each assembly stage where floor panels 517, 517-1 are delivered JIT to floor panel installation station 550, 550-1 and floor panels 517, 517-1 are added during installation into each half barrel section 128 respectively. The floor panels 517, 517-1 are installed 1918 during cargo floor grid 324 and passenger floor grid 326 installation into lower half barrel section 128 at floor grid attach station 530. Lower half barrel section 128 is then advanced in process direction 199 to inversion station 560 and then to join station 194.

Finally, the floor panels 517, 517-1 are added to the cargo floor grid 324 and passenger floor grid 326 at the installation station 550, 550-1, respectively, and are installed inverted into inverted lower half barrel section 128 first. Method 1900 includes full pulsing 1920 the cargo floor grid and the passenger floor grid to assembly stage for installation of each into half barrel section, respectively. First the cargo floor grid 324 is installed into the lower half barrel section 128. Then the passenger floor grid 326 arrives at floor grid attach station 530 and is installed inverted into lower half barrel section 128 thereafter. Floor grid attach station 530 is operable for installing an inverted floor grid 365 into an inverted lower half barrel section 118 of fuselage 12. In some illustrative examples, installing the floor grid 365 comprises installing a floor grid 365 that is substantially equal in length to the lower half barrel section 118 of fuselage 12. Sealant and fasteners are provided to floor grid attach station 530 in a just-in-time (JIT) fashion delivering just what is needed on feeder lines 519-8, 519-81, respectively. In some illustrative examples, method 1900 includes feeding fasteners 519-81, electrical equipment and plumbing 518 to work stations via a feeder line associated with each work station; and installing the fasteners 519-81, electrical equipment and plumbing 518 into the floor grid 365. Lower half barrel section 128 is then advanced in process direction 199 to inversion station 560 and then to join station 194. Vertical inversion station 560 is operable to rotate the lower half barrel section 118 to a keel-down orientation after installation of the floor grid 365.

Figure 12:
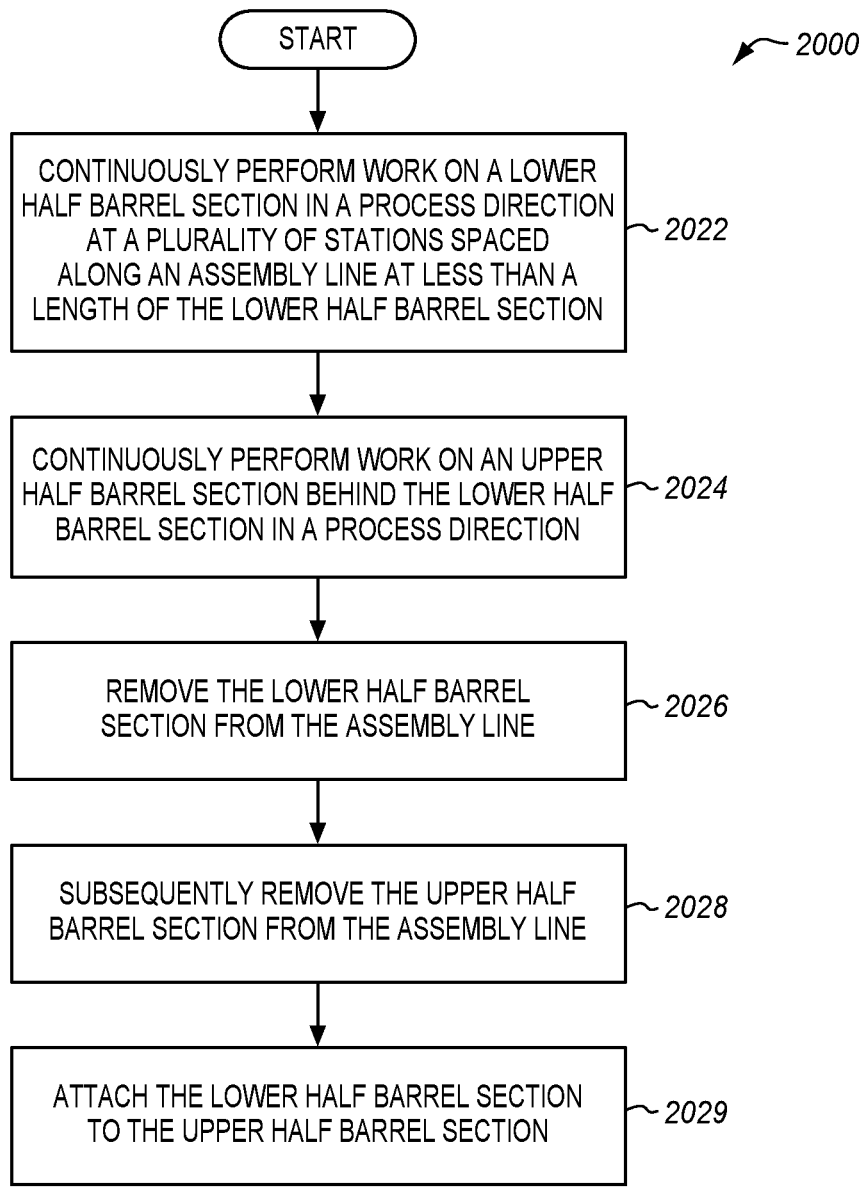
FIG. 12 is a flowchart illustrating a method of fabricating a portion of an airframe in an illustrative embodiment.

FIG. 12 is a flowchart 2000 illustrating methods of fabricating portions of an airframe (e.g., full barrel sections) in illustrative embodiments. The methods illustrated include continuously performing 2022 work on a lower half barrel section 118 in a process direction 199 at a plurality of work stations 114, 124 spaced along an assembly line 110, 120 at less than a length of the lower half barrel section 118, 128. The method further includes continuously performing 2024 work on an upper half barrel section 116, 126 behind the lower half barrel section 118, 128 in the process direction 199. The lower half barrel section 118, 128 is removed 2026 from the assembly line 110, 120. The upper half barrel section 116, 126 is subsequently removed 2028 from the assembly line 110, 120. Finally, the lower half barrel section 118, 128 is attached 2029 to the upper half barrel section 116, 126. In method 2000, the upper half barrel section 116, 126 may be referred to as an upper section. In method 2000, the lower half barrel section 118, 128 may be referred to as a lower section.

Further, the disclosure comprises examples according to the following clauses:

Clause 1. A method for assembling an aircraft 10, the method comprising: receiving a lower half barrel section 118 of fuselage 12 that is inverted to a keel-up orientation 563-3; and installing a floor grid 365 into the lower half barrel section 118 while inverted.

Clause 2. The method of clause 1 wherein installing the floor grid 365 comprises installing a floor grid 365 that is substantially equal in length to the lower half barrel section 118 of fuselage 12.

Clause 3. The method of clause 1 wherein installing the floor grid 365 into the lower half barrel section 118 comprises installing a passenger floor grid 326.

Clause 4. The method of clause 1 wherein installing the floor grid 365 into the lower half barrel section 118 comprises installing a cargo floor grid 324.

Clause 5. The method of clause 1 wherein installing the floor grid 365 into the lower half barrel section 118 comprises installing a cargo floor grid 324 and then installing a passenger floor grid 326.

Clause 6. The method of clause 1 wherein installing the floor grid 365 into the lower half barrel section 118 comprises installing the floor grid 365 into the lower half barrel section 118 in a completed state.

Clause 7. The method of clause 1 wherein installing the floor grid 365 into the lower half barrel section 118 comprises installing floor panels 517 into the floor grid 365 and then installing the floor grid 365 into the lower half barrel section 118.

Clause 8. The method of clause 1 further comprising:
advancing the lower half barrel section 118 in a process direction 199 after the floor grid 365 is installed; and rotating the lower half barrel section 118 to a keel down orientation 563-1.

Clause 9. The method of clause 1 further comprising: receiving floor beams 511 from a floor beam assembly feeder line 524; receiving intercostals 513 from an intercostal feeder line 522; and assembling the floor grid 365 from the intercostals 513 and floor beams 511 at a floor grid assembly station 520.

Clause 10. The method of clause 9 further comprising indexing the floor grid 365 to the floor grid assembly station 520.

Clause 11. The method of clause 9 further comprising: pulsing the floor grid 365 to a track installation station 540, 542, 544; indexing the floor grid 365 to the track installation station 540, 542, 544; and installing tracks onto the floor grid 365 at the track installation station 540, 542, 544.

Clause 12. The method of clause 11 wherein installing tracks comprises installing one or more of cargo tie down tracks 515, cargo roller tracks 516, and seat tracks.

Clause 13. The method of clause 9 further comprising: pulsing the floor grid 365 to an electrical equipment and plumbing installation station 545; indexing the floor grid 365 to the electrical equipment and plumbing installation station 545; and installing electrical equipment and plumbing 518 onto the floor grid 365 at the electrical equipment and plumbing installation station 545.

Clause 14. The method of clause 9 further comprising: pulsing the floor grid 365 to a floor panel installation station 550; and indexing the floor grid 365 to the floor panel installation station 550; and installing floor panels 517 onto the floor grid 365 at the floor panel installation station 550.

Clause 15. A portion of an aircraft 10 assembled according to the method of clause 1.

Clause 16. A system 500 comprising: a plurality of work stations that install floor grid components onto a floor grid 365; a track 541 that advances the floor grid 365 in a process direction 199 through the work stations; and at least one feeder line associated with one of the work stations, the feeder line operable to provide a floor grid component to the work station just in time for installation onto the floor grid 365.

Clause 17. The system according to clause 16 further comprising a floor grid attach station 530, the floor grid attach station 530 operable for installing an inverted floor grid 365 into an inverted lower half barrel section 118 of fuselage 12.

Clause 18. A system according to clause 17 further comprising a vertical inversion station 560 that is operable to rotate the lower half barrel section 118 to a keel-down orientation after installation of the floor grid 365.

Clause 19. The system of clause 16 wherein: the track 541 comprises two tracks, a first track operable for fabrication of a cargo floor grid 324, a second track operable for fabrication of a passenger floor grid 326; and the plurality of work stations comprises a first work station associated with the first track, and a second work station associated with the second track.

Clause 20. The system of clause 16 wherein the plurality of work stations further comprises a plurality of work stations configured in two parallel lines, a first portion of the work stations for assembling passenger floor grids 326, and a second portion of the work stations for assembling cargo floor grids 324.

Clause 21. The system of clause 20 wherein the first portion of the work stations comprises: a passenger floor grid assembly station 520-1; a seat track installation station 540, 543; an electrical equipment and plumbing installation station 545-1; and a floor panel installation station 550-1.

Clause 22. The system of clause 20 wherein the second portion of the work stations comprises: a cargo floor grid assembly station 520; a cargo tie down tracks installation station 542; a cargo roller tracks installation station 544; an electrical equipment and plumbing installation station 545; and a floor panel installation station 550.

Clause 23. The system of clause 20 further comprising indexing units 541-8, 541-9 associated with each of the plurality of work stations, the indexing units 541-8, 541-9 operable to interface to an indexing unit 541-1, 541-2 associated with the floor grid 365 to control a position of the floor grid 365 with respect to the work station.

Clause 24. The system of clause 20 further comprising feeder lines 502, each feeder line 502 operable to supply floor grid components to an associated one of the work stations.

Clause 25. Fabricating a portion of an aircraft 10 using the system of clause 16.

Clause 26. A method for fabricating a portion of an aircraft 10, the method comprising: feeding floor beams 511, intercostals 513, and tracks 515, 516 to work stations via a feeder line 502 associated with each work station; and assembling the floor beams 511, intercostals 513, and tracks 515, 516 together into a floor grid 365.

Clause 27. The method of clause 26 further comprising: advancing the floor grid 365 via pulsing by less than its length through the work stations, wherein the work stations operate to index to the floor grid 365 prior to performing work.

Clause 28. The method of clause 26 further comprising: feeding fasteners 519-81, electrical equipment and plumbing 518 to work stations via a feeder line associated with each work station; and installing the fasteners 519-81, electrical equipment and plumbing 518 into the floor grid 365.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for assembling an aircraft, the method comprising:
   receiving a lower half barrel section of fuselage that is inverted to a keel-up orientation;
   installing a floor grid into the lower half barrel section while inverted, wherein installing the floor grid into the lower half barrel section comprises installing a cargo floor grid and then installing a cabin floor grid;
   receiving floor beams from a floor beam assembly feeder line;
   receiving intercostals from an intercostal feeder line;
   indexing the floor beams and intercostals to a floor grid assembly station; and
   assembling the floor grid from the intercostals and floor beams at the floor grid assembly station.

2. The method of claim 1, wherein installing the floor grid comprises installing a floor grid that is substantially equal in length to the lower half barrel section of fuselage.

3. The method of claim 1, wherein installing the floor grid into the lower half barrel section comprises installing a passenger floor grid.

4. The method of claim 1, wherein installing the floor grid into the lower half barrel section comprises installing floor panels into the cargo floor grid and then installing the cargo floor grid into the lower half barrel section.

5. The method of claim 1, wherein installing the floor grid into the lower half barrel section comprises installing the floor grid into the lower half barrel section in a completed state.

6. The method of claim 1, wherein installing the floor grid into the lower half barrel section comprises installing floor panels into the floor grid and then installing the floor grid into the lower half barrel section.

7. A method for assembling an aircraft, the method comprising:
   receiving a lower half barrel section of fuselage that is inverted to a keel-up orientation;
   installing a floor grid into the lower half barrel section while inverted, wherein installing the floor grid into the lower half barrel section comprises installing a cargo floor grid and then installing a cabin floor grid;
   advancing the lower half barrel section in a process direction after the floor grid is installed; and
   rotating the lower half barrel section to a keel down orientation.

8. The method of claim 7, wherein installing the floor grid comprises installing a floor grid that is substantially equal in length to the lower half barrel section of fuselage.

9. The method of claim 7, wherein installing the floor grid into the lower half barrel section comprises installing a passenger floor grid.

10. The method of claim 7, wherein installing the floor grid into the lower half barrel section comprises installing floor panels into the cargo floor grid and then installing the cargo floor grid into the lower half barrel section.

11. The method of claim 7, wherein installing the floor grid into the lower half barrel section comprises installing the floor grid into the lower half barrel section in a completed state.

12. The method of claim 7, wherein installing the floor grid into the lower half barrel section comprises installing floor panels into the floor grid and then installing the floor grid into the lower half barrel section.

13. The method of claim 1, further comprising indexing the floor grid to the floor grid assembly station.

14. A method for assembling an aircraft, the method comprising:
- receiving a lower half barrel section of fuselage that is inverted to a keel-up orientation;
- installing a floor grid into the lower half barrel section while inverted, wherein installing the floor grid into the lower half barrel section comprises installing a cargo floor grid and then installing a cabin floor grid;
- receiving floor beams from a floor beam assembly feeder line;
- receiving intercostals from an intercostal feeder line; and
- assembling the floor grid from the intercostals and floor beams at a floor grid assembly station;
- pulsing the floor grid to a track installation station;
- indexing the floor grid to the track installation station; and
- installing tracks onto the floor grid at the track installation station.

15. The method of claim 14, wherein installing tracks comprises installing one or more of cargo tie down tracks, cargo roller tracks, and seat tracks.

16. The method of claim 14, wherein installing the floor grid comprises installing a floor grid that is substantially equal in length to the lower half barrel section of fuselage.

17. The method of claim 14, wherein installing the floor grid into the lower half barrel section comprises installing a passenger floor grid.

18. The method of claim 14, wherein installing the floor grid into the lower half barrel section comprises installing floor panels into the cargo floor grid and then installing the cargo floor grid into the lower half barrel section.

19. The method of claim 14, wherein installing the floor grid into the lower half barrel section comprises installing the floor grid into the lower half barrel section in a completed state.

20. The method of claim 14, wherein installing the floor grid into the lower half barrel section comprises installing floor panels into the floor grid and then installing the floor grid into the lower half barrel section.

21. A method for assembling an aircraft, the method comprising:
- receiving a lower half barrel section of fuselage that is inverted to a keel-up orientation;
- installing a floor grid into the lower half barrel section while inverted, wherein installing the floor grid into the lower half barrel section comprises installing a cargo floor grid and then installing a cabin floor grid;
- receiving floor beams from a floor beam assembly feeder line;
- receiving intercostals from an intercostal feeder line; and
- assembling the floor grid from the intercostals and floor beams at a floor grid assembly station;
- pulsing the floor grid to an electrical equipment and plumbing installation station;
- indexing the floor grid to the electrical equipment and plumbing installation station; and
- installing electrical equipment and plumbing onto the floor grid at the electrical equipment and plumbing installation station.

22. The method of claim 21, wherein installing the floor grid comprises installing a floor grid that is substantially equal in length to the lower half barrel section of fuselage.

23. The method of claim 21, wherein installing the floor grid into the lower half barrel section comprises installing a passenger floor grid.

24. The method of claim 21, wherein installing the floor grid into the lower half barrel section comprises installing floor panels into the cargo floor grid and then installing the cargo floor grid into the lower half barrel section.

25. The method of claim 21, wherein installing the floor grid into the lower half barrel section comprises installing the floor grid into the lower half barrel section in a completed state.

26. The method of claim 21, wherein installing the floor grid into the lower half barrel section comprises installing floor panels into the floor grid and then installing the floor grid into the lower half barrel section.

27. A method for assembling an aircraft, the method comprising:
- receiving a lower half barrel section of fuselage that is inverted to a keel-up orientation;
- installing a floor grid into the lower half barrel section while inverted, wherein installing the floor grid into the lower half barrel section comprises installing a cargo floor grid and then installing a cabin floor grid;
- receiving floor beams from a floor beam assembly feeder line;
- receiving intercostals from an intercostal feeder line; and
- assembling the floor grid from the intercostals and floor beams at a floor grid assembly station;
- pulsing the floor grid to a floor panel installation station;
- indexing the floor grid to the floor panel installation station; and
- installing floor panels onto the floor grid at the floor panel installation station.

28. The method of claim 27, wherein installing the floor grid comprises installing a floor grid that is substantially equal in length to the lower half barrel section of fuselage.

29. The method of claim 27, wherein installing the floor grid into the lower half barrel section comprises installing a passenger floor grid.

30. The method of claim 27, wherein installing the floor grid into the lower half barrel section comprises installing floor panels into the cargo floor grid and then installing the cargo floor grid into the lower half barrel section.

31. The method of claim 27, wherein installing the floor grid into the lower half barrel section comprises installing the floor grid into the lower half barrel section in a completed state.

32. The method of claim 27, wherein installing the floor grid into the lower half barrel section comprises installing floor panels into the floor grid and then installing the floor grid into the lower half barrel section.

\* \* \* \* \*